United States Patent [19]
Suzuki et al.

[11] Patent Number: 5,642,165
[45] Date of Patent: Jun. 24, 1997

[54] MOTION PICTURE ENCODING METHOD AND APPARATUS

[75] Inventors: Teruhiko Suzuki, Chiba; Katsumi Tahara, Kanagawa; Tak Yen Tong, Tokyo, all of Japan

[73] Assignee: Sony Corporation, Tokyo, Japan

[21] Appl. No.: 520,841

[22] Filed: Aug. 29, 1995

[30] Foreign Application Priority Data

Aug. 31, 1994 [JP] Japan .................. 6-232334

[51] Int. Cl.$^6$ .................. H04N 7/36; H04N 7/50
[52] U.S. Cl. .................. 348/404; 348/405
[58] Field of Search .................. 348/405, 406, 348/404, 401, 402, 409, 412, 413, 415, 416; H04N 7/50, 7/36

[56] References Cited

U.S. PATENT DOCUMENTS

| | | | |
|---|---|---|---|
| 4,189,748 | 2/1980 | Reis | 348/404 |
| 5,073,821 | 12/1991 | Juri | 348/405 |
| 5,542,008 | 7/1996 | Sugahara | 348/405 |

*Primary Examiner*—Howard W. Britton
*Attorney, Agent, or Firm*—William S. Frommer; Alvin Sinderbrand

[57] ABSTRACT

A motion picture encoding method and apparatus for adaptively switching filters in accordance with the property of a motion picture and the condition for encoding and to improve the encoding efficiency. A motion picture is encoded a plurality of times, an encoding parameter for encoding is optimized, the property of the motion picture signal is measured, and filtering is performed by using the encoding parameter or the property of the measured motion picture signal and thereby optimizing the filter characteristic only for the final-time encoding so as to practically generate and output an encoding signal (bit stream).

15 Claims, 20 Drawing Sheets

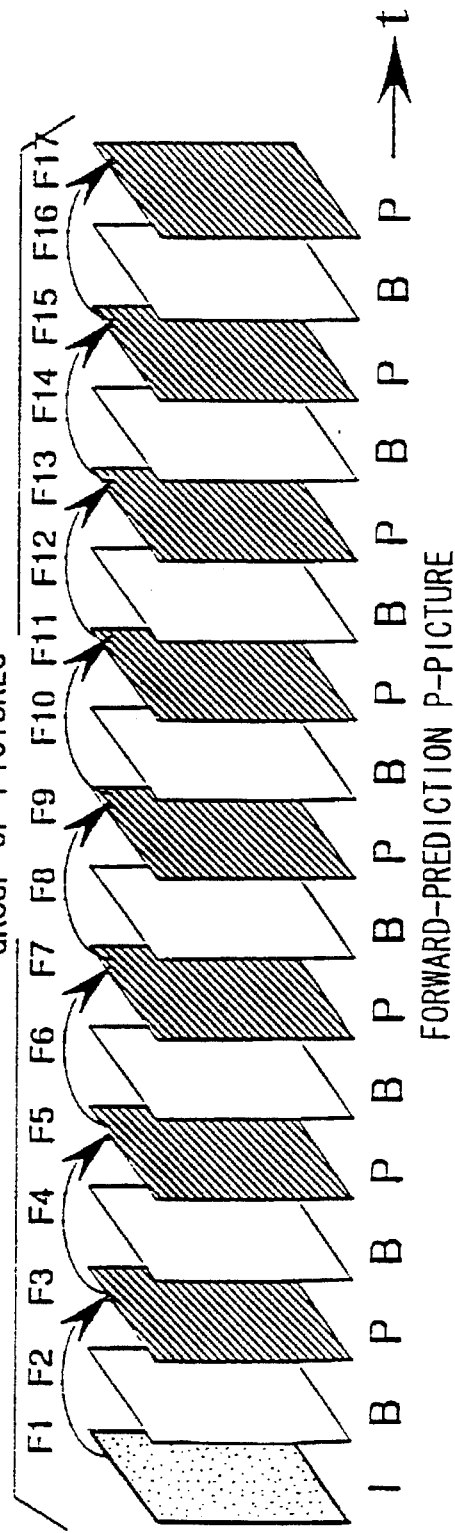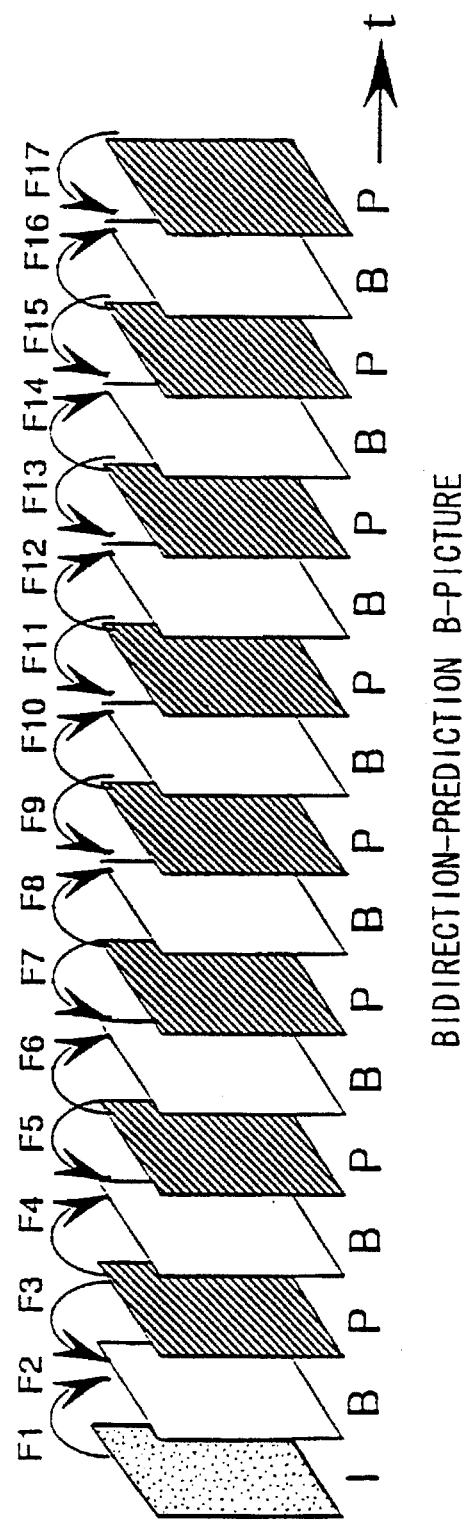
FIG. 2A (RELATED ART)
FIG. 2B (RELATED ART)

FRAME PREDICTION MODE

FIELD PREDICTION MODE

—— FIRST-FIELD DATA
----- SECOND-FIELD DATA

FRAME DCT MODE

FIELD DCT MODE

——— FIRST-FIELD DATA
------- SECOND-FIELD DATA

| 1/16 | 1/8 | 1/16 |
|------|-----|------|
| 1/8  | 1/4 | 1/8  |
| 1/16 | 1/8 | 1/16 |

3×3 FILTER FACTORS

FIG. 11 A (RELATED ART)

| a | b | c |
|---|---|---|
| d | e | f |
| g | h | i |

3×3 INPUT PIXEL BLOCKS

FIG. 11 B (RELATED ART)

MOTION PICTURE ENCODING METHOD AND APPARATUS

BACKGROUND OF THE INVENTION

Field of the Invention

This invention relates to a motion picture encoding method and a motion picture encoding apparatus preferably used to record a motion picture signal in a recording medium such as an optical disk or magnetic tape and reproduce and display it or used for a video conference system, video telephone system, or broadcasting unit which transmits a motion picture signal from a transmitting side to a receiving side through a transmission line and receives and displays it at the receiving side.

For example, in the case of a system for transmitting a motion picture signal to a remote place such as a video conference system or video telephone system, the picture signal is compressed and encoded by using the line correlation or interframe correlation of the video signal in order to efficiently use the transmission line. FIG. 4 shows the structures of motion picture encoding and decoding apparatuses for encoding, transmitting, and decoding a motion picture signal. An encoding apparatus 1 encodes an input video signal VD and transmits the video signal VD to a recording medium 3 serving as a transmission line. The decoding apparatus 2 reproduces a signal recorded in the recording medium 3 and decodes and outputs it.

In the encoding apparatus 1, the input video signal VD is supplied to a preprocessing circuit 11 where the signal VD is divided into a luminance signal and a color signal (in this case, a chrominance signal) and these signals are analog-to-digital-converted by analog-to-digital (A/D) converters 12 and 13 respectively. The video signal converted into a digital signal by the analog-to-digital conversion by analog-to-digital (A/D) converters 12 and 13 is inputted to and filtered by a prefilter 19 and thereafter supplied to and stored in a frame memory 14. The frame memory 14 stores the luminance signal in a luminance-signal frame memory 15 and the chrominance signal in a chrominance-signal frame memory 16 respectively.

The prefilter 19 performs processing for improving the encoding efficiency and the picture quality. This is, for example, a filter for removing noises or limiting a bandwidth. A two-dimensional low-pass filter can be used as the prefilter 19. FIG. 11B shows 3×3 pixel blocks serving as inputs of the prefilter 19. In this case, the 3×3 pixel blocks around an object pixel "e" are used to obtain an output value of a filter corresponding to the pixel "e". FIG. 11A shows filter factors which are given to each of the pixels "a" to "i". Actually, in the prefilter 19, the following equation is performed:

$$\tfrac{1}{16}\times a + \tfrac{1}{8}\times b + \tfrac{1}{16}\times c + \tfrac{1}{8}\times d + \tfrac{1}{4}\times e + \tfrac{1}{8}\times f + \tfrac{1}{16}\times g + \tfrac{1}{8}\times h + \tfrac{1}{16}\times i \qquad (1)$$

and an output of this operation is assumed as an output value of a filter corresponding to the pixel "e". FIG. 10 shows the structure of two-dimensional low-pass filter which performs such operation. In FIG. 10, DL1 and DL2 are one-line delay, D1 to D6 are one pixel delay, AD1 to AD4 are adders, and BF1 to BF4 are multiplexers multiplying an input value by ½.

Practically, a filtered output value is outputted from an output OUT2 and an original pixel value not filtered is outputted from an output OUT1 after a predetermined delay. The filter always performs uniform filtering independently of an input video signal or the state of an encoder.

Returning to FIG. 4, a format conversion circuit 17 converts a video signal stored in the frame memory 14 to an input format of the encoder 18. Data converted to a predetermined format is supplied to the encoder 18 from the format conversion circuit 17 where the data is encoded. Though the encoding algorithm is optional, an example of the algorithm is described later in detail by referring to FIG. 6. The signal encoded by the encoder 18 is outputted to a transmission line as a bit stream and stored in, for example, the recording medium 3.

The data reproduced from the recording medium 3 is supplied to and decoded by a decoder 31 of the decoding apparatus 2. Though the decoding algorithm of the decoder 31 can be optional, it must be paired with an encoding algorithm. An example of the decoding algorithm is described later in detail by referring to FIG. 9. The data decoded by the decoder 31 is inputted to a format conversion circuit 32 and converted to an output format.

Then, a luminance signal with a frame format is supplied to and stored in a luminance-signal frame memory 34 of a frame memory 33 and a chrominance signal is supplied to and stored in a chrominance-signal frame memory 35. The luminance signal and the chrominance signal read out of the luminance-signal frame memory 34 and the chrominance-signal frame memory 35 are supplied to and filtered by a postfilter 39, thereafter digital-to-analog-converted by digital-to-analog (D/A) converters 36 and 37 respectively, and supplied to and synthesized by a postprocessing circuit 38. Then, they are outputted to and displayed on a not-illustrated display such as a CRT as output video signals.

The postfilter 39 performs the filtering for improving the picture quality. The postfilter 39 is used to moderate deterioration caused by encoding a picture. The postfilter 39 is a filter for removing, for example, a block distortion, a noise generated in the vicinity of a steep edge, or a quantized noise. Though the postfilter includes various types, it is possible to use a two-dimensional low-pass filter same as one used for the prefilter 19 as shown in FIG. 10.

Then, very efficient encoding of a motion picture is described below. Because motion picture data such as a video signal has very much information content, a recording medium with a very-high data transmission rate has been required so far in order to record and reproduce it for a long time. Therefore, a large magnetic tape or optical disc has been required. Moreover, to transmit motion picture data through a transmission line or to use the motion picture data for broadcast, there has been a problem that the data cannot directly be transmitted through an existing transmission line because data content is too much.

Therefore, to record video signals in a smaller recording medium for a long time, or to use them for broadcast, it is indispensable to use means for very efficiently encoding and recording the video signals and very efficiently decoding the read signals. To meet these requests, very-efficient encoding methods using the correlation between video signals are proposed. The MPEG (Moving Picture Experts Group) method is one of the above methods. This method is discussed in ISO-IEC/JTC1/SC2/WG11 and proposed as a standard plan, which is a hybrid method realized by combining the motion compensative prediction encoding with the discrete cosine transform (DCT) encoding.

The motion compensative prediction encoding is a method using the correlation between video signals in the time base direction, in which information content necessary for encoding is compressed by predicting a present inputted picture from an already-decoded and reproduced known signal and transmitting only the then prediction error. The DCT encoding makes it possible to compress information content by using the in-frame two-dimensional correlation between video signals, thereby concentrating signal power on a certain frequency component, and encoding only concentratedly distributed factors. For example, at a portion with a flat pattern and a high autocorrelativity between video signals, DCT factors are concentratedly distributed to a low frequency component. Therefore, in this case, information content can be compressed by encoding only the factors concentratedly distributed to a low frequency band. Though a case of using MPEG2 method for an encoder is described below in detail, the encoding method is not restricted to the MPEG2 method, it can also be applied to any encoding method.

The MPEG2 method is described below in detail. By using the line correlation, it is possible to compress a video signal by means of, for example, DCT. Moreover, by using the inter-frame correlation, it is possible to encode the video signal by further compressing it. For example, as shown in FIGS. 1A and 1B, when frame pictures PC1, PC2, and PC3 are generated at times t1, t2, and t3 respectively, a frame picture PC12 is generated by computing a difference of video signal between the frame pictures PC1 and PC2 and moreover, a frame picture PC23 is generated by computing a difference between the frame pictures PC2 and PC3. Because temporally-adjacent frame pictures do not normally have a very large change, a differential signal obtained by computing a difference between the frame pictures has a small value. Therefore, by encoding the differential signal, the number of codes can be compressed.

However, by transmitting only a differential signal, it is impossible to restore an original picture. Therefore, a video signal is compressed and encoded by processing each frame picture as any one of such three pictures as an I-picture, P-picture, and B-picture. That is, as shown in FIGS. 2A and 2B, video signals of seventeen frames from F1 to F17 are assumed as a group of pictures (GOP) to be used as one unit for processing. Then, the video signal of the first frame F1 is encoded as an I-picture, that of the second frame F2 is processed as a B-picture, and that of the third frame F3 is processed as a P-picture. The fourth frame and subsequent frames from F4 to F17 are alternately processed as a B-picture or P-picture.

Video signals of I-pictures for one frame are directly transmitted. In the case of video signals of P-pictures, however, a difference from the video signal of temporally preceding I- or P-picture is transmitted basically as shown in FIG. 2A. Moreover, as for the video signals of B-pictures, a difference is obtained from the average value of the preceding and following frames and encoded basically as shown in FIG. 2B.

FIGS. 3A and 3B show the theory of a method for thus encoding a motion picture signal. Because the first frame F1 is processed as an I-picture, it is directly transmitted to a transmission line as transmission data F1X (in-picture encoding). However, because the second frame F2 is processed as a B-picture, a difference from the average value of the temporally preceding frame F1 and the temporally following frame F3 is computed and the difference is transmitted as transmission data F2X.

The processing as a B-picture is further classified into four types. The first processing directly transmits the data for the original frame F2 as the transmission data F2X (SP1) (intra-encoding), which is the same processing as the case of an I-picture. The second processing computes a difference from the temporally following frame F3 and transmits the difference (SP2) (backward prediction encoding). The third processing transmits a difference from the temporally preceding frame F1 (SP3) (forward prediction encoding). The fourth processing generates a difference (SP4) from the average value of the temporally preceding frame F1 and the following frame F3 and transmits the difference as transmission data F2X (bidirectional prediction encoding).

Among these four methods, a method for minimizing transmission data content is appropriately adopted in macroblock unit. When transmitting differential data, motion vector x1 inbetween with the picture (prediction picture) of a frame for which a difference is computed (motion vector between the frames F1 and F2) (in the case of forward prediction), motion vector x2 (motion vector between the frames F3 and F2) (in the case of backward prediction), or both motion vectors x1 and x2 (in the case of bidirectional prediction) are transmitted together with differential data.

As for the frame F3 of P-picture, transmitting the temporally preceding frame F1 as a prediction picture a differential signal (SP3) with the frame F3 and the motion vector x3 are computed and transmitted as transmission data F3X (forward prediction encoding). Or, the data for the original frame F3 is directly transmitted as transmission data F3X (SP1) (intra-encoding). Out of these two methods, a method for minimizing transmission data is appropriately selected in macroblock unit similarly to the case of B-picture.

Then, the structure of the encoder 18 is described below by referring to FIG. 6. Picture data BD to be encoded is inputted to a motion vector detection circuit (MV-Det) 50 in macroblocks. The motion vector detection circuit 50 processes the picture data for each frame as an I-picture, P-picture, or B-picture in accordance with a preset sequence. It is predetermined that the picture for each sequentially inputted frame is processed as any one of I-, P-, and B-pictures (as shown in FIGS. 2A and 2B, for example, the group of pictures comprising the frames F1 to F17 are processed as I, B, P, B, P . . . , B, P).

The picture data for a frame to be processed as an I-picture (e.g. frame F1) is transferred from the motion vector detection circuit 50 to and stored in a forward original picture section 51a of a frame memory 51, the picture data for a frame to be processed as a B-picture (e.g. frame F2) is transferred to and stored in an original picture section 51b, and the picture data for a frame to be processed as a P-picture (e.g. frame F3) is transferred to and stored in a backward original picture section 51c.

Moreover, when the picture of a frame to be processed as a B-picture (frame F4) or P-picture (Frame F5) is inputted at the next timing, the picture data for the first P-picture (frame F3) having been stored in the backward original picture section 51c so far is transferred to the forward original picture section 51a, the picture data for the next B-picture (frame F4) is stored (overwritten) in the original picture section 51b, and the picture data for the next P-picture (frame F5) is stored (overwritten) in the backward original picture section 51c. These operations are sequentially repeated.

The signal of each picture stored in the frame memory 51 is read out of the memory 51, to which frame prediction mode processing or field prediction mode processing is applied by a prediction mode switching circuit (Mode-SW) 52. Moreover, in-picture prediction, forward prediction, backward prediction, or bidirectional prediction is performed by an arithmetic section 53 under control of a prediction and decision circuit 54. Among these processing, a processing to be performed is determined correspondingly to a prediction error signal (difference between a reference picture to be processed and a prediction picture corresponding to the reference picture). Therefore, the motion vector detection circuit 50 generates the sum (square sum can also be used) of absolute values of prediction error signals used for the above decision.

The frame prediction mode and field prediction mode of the prediction mode switching circuit 52 are described below. When the frame prediction mode is set, the prediction mode switching circuit 52 directly outputs four luminance blocks Y[1] to Y[4] supplied from the motion vector detection circuit 50 to the rear-stage arithmetic section 53. That is, in this case, line data in an odd field and line data in an even field are mixed in each luminance block as shown in FIG. 7A. In this frame prediction mode, prediction is performed every four luminance blocks (macroblocks) and one motion vector corresponds to four luminance blocks.

However, the prediction mode switching circuit 52 outputs a signal with the structure shown in FIG. 7A supplied from the motion vector detection circuit 50 to the arithmetic section 53 in the field prediction mode by constituting luminance blocks Y[1] and Y[2] among four luminance blocks only with dots of lines of odd fields and two other luminance blocks Y[3] and Y[4] with data for lines of even fields as shown in FIG. 7B. In this case, one motion vector corresponds to two luminance blocks Y[1] and Y[2] and the other motion block corresponds to two other luminance blocks Y[3] and Y[4].

The motion vector detection circuit 50 outputs the sum of absolute values of prediction errors in the frame prediction mode and that of absolute values of prediction errors in the field prediction mode to the prediction mode switching circuit 52. The prediction mode switching circuit 52 compares the sum of absolute values of prediction errors in the frame prediction mode with that in the field prediction mode and processes a prediction mode with smaller sum to output data to the arithmetic section 53. However, the processing is actually performed by the motion vector detection circuit 50. That is, the motion vector detection circuit 50 outputs a signal with a structure corresponding to the determined mode to the prediction mode switching circuit 52 and the prediction mode switching circuit 52 directly outputs the signal to the rear-stage arithmetic section 53.

In the frame prediction mode, as shown in FIG. 7A, a chrominance signal is supplied to the arithmetic section 53 under the state in which data for lines of odd fields is mixed with data for lines of even fields. In the field prediction mode, as shown in FIG. 7B, each upper half (4 lines) of chrominance blocks Cb and Cr is used for a chrominance signal of odd fields corresponding to the luminance blocks Y[1] and Y[2] and each lower half (4 lines) of them is used for a chrominance signal of even fields corresponding to the luminance blocks Y[3] and Y[4].

Moreover, the motion vector detection circuit 50 generates the sum of absolute values of prediction errors for determining by the prediction and decision circuit 54 whether to perform any one of in-picture prediction, forward prediction, backward prediction, and bidirectional prediction as follows. That is, the circuit 50 obtains the difference between the absolute value $|\Sigma A_{ij}|$ of the sum $\Sigma A_{ij}$ of signal $A_{ij}$ of macroblocks of a reference picture and the sum $\Sigma |A_{ij}|$ of the absolute values $|A_{ij}|$ of signals $A_{ij}$ of macroblocks as the sum of absolute values of prediction errors of in-picture prediction. Moreover, the circuit 50 obtains the sum $\Sigma |A_{ij}-B_{ij}|$ of the absolute values $|A_{ij}-B_{ij}|$ of the differences $A_{ij}-B_{ij}$ between the signals $A_{ij}$ of macroblocks of a reference picture and the signals $B_{ij}$ of macroblocks of a prediction picture as the sum of absolute values of prediction errors of forward prediction.

The sum of absolute values of prediction errors in the backward prediction and that in the bidirectional prediction are obtained similarly to the case of the forward prediction (that is, by changing the prediction picture to a prediction picture different from the case of the forward prediction). These sums of absolute values are supplied to the prediction and decision circuit 54. The prediction and decision circuit 54 selects the smallest sum of absolute values out of the sums of prediction errors in the forward prediction, backward prediction, and bidirectional prediction as the sum of absolute values of prediction errors in the inter-prediction. Moreover, the circuit 54 compares the sum of absolute values of prediction errors in the inter-prediction with that in the in-picture prediction, selects the smaller sum of absolute values and moreover selects a mode corresponding to the selected sum of absolute values as a prediction mode (P-mode). That is, if the sum of absolute values of prediction errors in the in-picture prediction is smaller, in-picture prediction mode is set. If the sum of absolute values of prediction errors in the inter-prediction is smaller, a mode with the smallest corresponding sum of absolute values is set among the forward, backward, and bidirectional prediction modes.

Thus, the motion vector detection circuit 50 has a structure corresponding to a mode selected by the prediction mode switching circuit 52 out of the frame and field prediction modes, supplies signals of macroblocks of a reference picture to the arithmetic section 53 through the prediction mode switching circuit 52, and also detects a motion vector between a prediction picture corresponding to a prediction mode (P-mode) selected by the prediction and decision circuit 54 among four prediction modes and a reference picture and outputs the motion vector to a variable-length encoding circuit (VLC) 58 and a motion compensation circuit (M-comp) 64. As described above, a motion vector with the minimum corresponding sum of absolute values of prediction errors is selected as the above motion vector.

When the motion vector detection circuit 50 reads picture data for an I-picture from the forward original picture section 51a, the prediction and decision circuit 54 sets an in-frame (in-picture) prediction mode (mode not performing motion compensation) as a prediction mode and switches the contact of a switch 53d of the arithmetic section 53 to "a". Thereby, the picture data for an I-picture is inputted to a DCT mode switching circuit (DCT CTL) 55. The DCT mode switching circuit 55, as shown in FIG. 8A or 8B, sets the data for four luminance blocks to the state in which lines of odd fields and lines of even fields are mixed (frame DCT mode) or the state in which they are separated from each other (field DCT mode) and outputs the data to a DCT circuit 56.

That is, the DCT mode switching circuit 55 compares the encoding efficiency when performing DCT processing by mixing the data in odd fields with the data in even fields with the encoding efficiency when performing DCT processing by separating the former and the latter from each other, and selects a mode with a high encoding efficiency. For example, as shown in FIG. 8A, the circuit 55 forms an inputted signal into a structure in which lines of odd fields are mixed with those of even fields, computes differences between signals of lines of odd fields and those of lines of even fields which are vertically adjacent each other, and moreover obtains the sum (or square sum) of the absolute values.

Moreover, as shown in FIG. 8B, the circuit 55 forms an inputted signal into a structure in which lines of odd fields are separated from those of even fields, computes differences between signals of lines of vertically-adjacent odd fields and differences between signals of lines of vertically-adjacent even fields, and obtains each sum of absolute values of the differences (or square sum). Moreover, the circuit 55 compares both sums (sums of absolute values) and sets a DCT mode corresponding to the smaller sum. That is, the circuit 55 sets the frame DCT mode if the former is smaller and the field DCT mode if the latter is smaller. Furthermore, the circuit 55 outputs data with a structure corresponding to the selected DCT mode to the DCT circuit 56 and also outputs a DCT flag (DCT-FLG) showing the selected DCT mode to the variable-length encoding circuit 58 and the motion compensation circuit 64 or a block rearrangement circuit 65.

As clarified by comparing the prediction mode (FIGS. 7A and 7B) of the prediction mode switching circuit 52 with the DCT mode (FIGS. 8A and 8B) of the DCT mode switching circuit 55, the data structures in both modes are practically the same for the luminance block. When the frame prediction mode (mode in which an odd line and an even line are mixed) is selected in the prediction mode switching circuit 52, the frame DCT mode (mode in which an odd line and an even line are mixed) may also easily be selected in the DCT mode switching circuit 55. Moreover, when the field prediction mode (mode in which data in an odd field is separated from data in an even field is selected in the prediction mode switching circuit 52 the field DCT mode (mode in which data in an odd field is separated from data in an even field) may also easily be selected in the DCT mode switching circuit 55.

However, the above selections are not always made. A mode is determined in the prediction mode switching circuit 52 so that the sum of absolute values of prediction errors decreases and a mode is determined in the DCT mode switching circuit 55 so that the encoding efficiency is improved. The picture data for an I-picture outputted from the DCT mode switching circuit 55 is inputted to the DCT circuit 56 where the data is provided with DCT processing, and converted to a DCT factor. The DCT factor is inputted to a quantization circuit (Q) 57 and quantized by a quantization scale (QS) corresponding to the stored data content (quantization control signal (B-full)) of a transmission buffer (Buffer) 59, and thereafter inputted to the variable-length encoding circuit 58.

The variable-length encoding circuit 58 converts picture data (in this case, data for an I-picture) corresponding to quantization scale (QS) supplied from the quantization circuit 57 to a variable-length code such as a Huffman code and outputs the code to the transmission buffer 59. Moreover, the variable-length encoding circuit 58 receives a quantization scale (QS) from the quantization circuit 57, a prediction mode (mode (P-mode) showing which one is set out of in-picture prediction, forward prediction, backward prediction, and bidirectional prediction) from the prediction and decision circuit 54, a motion vector (MV) from the motion vector detection circuit 50, a prediction flag (flag (P-FLG) showing which one is set out of frame prediction mode and field prediction mode) from the prediction mode switching circuit 52, and a DCT flag (flag (DCT-FLG) showing which one is set out of frame DCT mode and field DCT mode) outputted from the DCT mode switching circuit 55. These inputs are also variable-length-encoded.

The transmission buffer 59 temporarily stores inputted data and outputs data corresponding to the stored data content to the quantization circuit 57. When the remaining data content increases up to an allowable upper limit, the transmission buffer 59 decreases the quantized data content by increasing a quantization scale (QS) of the quantization circuit 57 in accordance with a quantization control signal (B-full). However, when the remaining data content decreases down to an allowable lower limit, the transmission buffer 59 increases the quantized data content by decreasing the quantization scale (QS) of the quantization circuit 57 in accordance with the quantization control signal (B-full). Thus, the overflow or underflow of the transmission buffer 59 is prevented. Then, the data stored in the transmission buffer 59 is read at a predetermined timing, outputted to a transmission line, and recorded in, for example, the recording medium 3.

The data for an I-picture outputted from the quantization circuit 57 is inputted to an inverse quantization circuit (IQ) 60 and inversely quantized correspondingly to the quantization scale (QS) supplied from the quantization circuit 57. An output of the inverse quantization circuit 60 is inputted to an inverse-DCT (IDCT) circuit 61 and provided with inverse DCT processing, and thereafter blocks are rearranged for each DCT mode (frame/field) by the block rearrangement circuit (Block Change) 65. An output of the block rearrangement circuit 65 is supplied to and stored in a forward prediction picture section (F-P) 63a of a frame memory 63 through a computing unit 62.

When the motion vector detection circuit 50 processes picture data for each sequentially-inputted frame as I-, B-, P-, B-, P-, ..., or B-picture, it processes the picture data for the first inputted frame as an I-picture and thereafter processes the picture data for the third inputted frame as a P-picture before processing the picture of the second inputted frame as a B-picture. This is because decoding cannot be made unless the P-picture serving as a backward prediction picture is already prepared because the B-picture is followed by backward prediction.

Therefore, the motion vector detection circuit 50 processes the I-picture and thereafter starts processing the picture data for the P-picture stored in the backward original picture section 51c. Then, similarly to the case above described, the sum of absolute values of inter-frame differences (prediction errors) for each macroblock is supplied to the prediction mode switching circuit 52 and the prediction and decision circuit 54 from the motion vector detection circuit 50. The prediction mode switching circuit 52 and the prediction and decision circuit 54 set the frame/field prediction mode or the in-picture-prediction, forward-prediction, backward-prediction, or bidirectional-prediction mode correspondingly to the sum of absolute values of prediction errors of macroblocks of the P-picture.

When the in-frame prediction mode is set, the arithmetic section 53 switches the contact of the switch 53d to "a" as described above. Therefore, the data is transmitted to a transmission line through the DCT mode switching circuit 55, DCT circuit 56, quantization circuit 57, variable-length encoding circuit 58, and transmission buffer 59 the same as the data for the I-picture is. Moreover, the data is supplied to and stored in a backward prediction picture section (B-P) 63b of the frame memory 63 through the inverse quantization circuit 60, inverse DCT circuit 61, block rearrangement circuit 65, and computing unit 62.

In the forward prediction mode, the contact of the switch 53d is switched to "b", and the data for a picture (in this case, an I-picture) is read from the forward prediction picture section 63a of the frame memory 63 and motion-compensated by the motion compensation circuit 64 correspondingly to a motion vector outputted from the motion vector detection circuit 50. That is, when setting of the forward prediction mode is commanded by the prediction and decision circuit 54, the motion compensation circuit 64 reads the data to generate prediction picture data by shifting a read address of the forward prediction picture section 63a by a distance corresponding to the motion vector from a position corresponding to the position of a macroblock currently outputted by the motion vector detection circuit 50.

The prediction picture data outputted from the motion compensation circuit 64 is supplied to the computing unit 53a. The computing unit 53a subtracts prediction picture data corresponding to the macroblock supplied from the motion compensation circuit 64 from the data for the macroblock of a reference picture supplied from the prediction mode switching circuit 52 and outputs the difference (prediction error). The differential data is transmitted to a transmission line through the DCT mode switching circuit 55, DCT circuit 56, quantization circuit 57, variable-length encoding circuit 58, and transmission buffer 59. Moreover, the differential data is locally decoded by the inverse quantization circuit 60 and inverse DCT circuit 61 and inputted to the computing unit 62 through the block rearrangement circuit 65.

The same data as the prediction picture data supplied to the computing unit 53a is also supplied to the computing unit 62. The computing unit 62 adds the prediction picture data outputted by the motion compensation circuit 64 to the differential data outputted by the inverse DCT circuit 61. Thereby, the picture data for the original (decoded) P-picture is obtained. The picture data for the P-picture is supplied to and stored in the backward prediction picture section 63b of the frame memory 63.

After the data for the I-picture and the data for the P-picture are stored in the forward prediction picture section 63a and the backward prediction picture section 63b respectively, the motion vector detection circuit 50 processes the B-picture. The prediction mode switching circuit 52 and the prediction and decision circuit 54 set the frame/field mode correspondingly to the sum of absolute values of inter-frame differences for each macroblock and moreover set the prediction mode to any one of the in-frame prediction mode, forward prediction mode, backward prediction mode, and bidirectional prediction mode. As described above, in the in-frame prediction mode or forward prediction mode, the contact of the switch 53d is switched to "a" or "b". In this case, processing same as that for the P-picture is performed and data is transmitted.

However, when the backward prediction mode or bidirectional prediction mode is set, the contact of the switch 53d is switched to "c" or "d". In the backward prediction mode in which the contact of the switch 53d is switched to "c", the data for a picture (in this case, a P-picture) is read from the backward prediction picture section 63b and motion-compensated by the motion compensation circuit 64 correspondingly to a motion vector outputted from the motion vector detection circuit 50. That is, when setting of the backward prediction mode is commanded by the prediction and decision circuit 54, the motion compensation circuit 64 reads the data to generate prediction picture data by shifting a read address of the backward prediction picture section 63b by a distance corresponding to the motion vector from a position corresponding to the position of a macroblock currently outputted by the motion vector detection circuit 50.

The prediction picture data outputted from the motion compensation circuit 64 is supplied to the computing unit 53b. The computing unit 53b subtracts prediction picture data supplied from the motion compensation circuit 64 from the data for the macroblock of a reference picture supplied from the prediction mode switching circuit 52 and outputs the difference. The differential data is transmitted to a transmission line through the DCT mode switching circuit 55, DCT circuit 56, quantization circuit 57, variable-length encoding circuit 58, and transmission buffer 59.

In the bidirectional prediction mode in which the contact of the switch 53d is switched to "d", the data for a picture (in this case, an I-picture) is read from the forward prediction picture section 63a and the data for a picture (in this case, a P-picture) is read from the backward prediction picture section 63b, and both data values are motion-compensated by the motion compensation circuit 64 correspondingly to a motion vector outputted from the motor vector detection circuit 50. That is, when setting of the bidirectional prediction mode is commanded by the prediction and decision circuit 54, the motion compensation circuit 64 reads the data to generate prediction picture data by shifting read addresses of the forward prediction picture section 63a and backward prediction picture section 63b by a distance corresponding to motion vectors (two motion vectors—one for a forward prediction picture and the other for a backward prediction picture) from a position corresponding to the position of the macroblock currently outputted from the motion vector detection circuit 50.

The prediction picture data outputted from the motion compensation circuit 64 is supplied to a computing unit 53c. The computing unit 53c subtracts the average value of the prediction picture data supplied by the motion compensation circuit 64 from the data for the macroblock of an reference picture supplied by the motion vector detection circuit 50 and outputs the difference. The differential data is transmitted to a transmission line through the DCT mode switching circuit 55, DCT circuit 56, quantization circuit 57, variable-length encoding circuit 58, and transmission buffer 59. The picture of a B-picture is not stored in the frame memory 63 because it is not used for a prediction picture for other pictures.

In the frame memory 63, the forward prediction picture section 63a and the backward prediction picture section 63b are bank-switched according to necessity and a predetermined reference picture stored in one section or the other can be outputted as a forward prediction picture or a backward prediction picture by switching the pictures. The above description is stressed on a luminance block. However, a chrominance block is also processed and transmitted for each of the macroblocks shown in FIGS. 7A, 7B, 8A and 8B. Motion vectors for processing the chrominance block use motion vectors obtained by halving the motion vector of a corresponding luminance block in the vertical and horizontal directions respectively.

FIG. 9 shows the structure of the decoder 31 in FIG. 4. The picture data transmitted and encoded through a transmission line (recording medium 3) is received and reproduced by a not-illustrated receiving circuit and a replaying unit and temporarily stored in a receiving buffer (Buffer) 81, and thereafter supplied to a variable-length decoding circuit (IVLC) 82 of a decoding circuit 90. The variable-length decoding circuit 82 variable-length-decodes the data supplied from the receiving buffer 81 and supplies the motion vector (MV), prediction mode (P-mode), and prediction flag (P-FLG) to a motion compensation circuit (M-comp) 87. Moreover, the circuit 82 outputs the DCT flag (DCT-FLG) to an inverse block rearrangement circuit (Block Change) 88, and the quantization scale (QS) to an inverse quantization circuit (IQ) 83 respectively, and outputs the decoded picture data to the inverse quantization circuit 83.

The inverse quantization circuit 83 inversely quantizes the picture data supplied from the variable-length decoding circuit 82 in accordance with the quantization scale (QS) similarly supplied from the variable-length decoding circuit 82 and outputs the inversely-quantized picture data to the inverse DCT circuit (IDCT) 84. The data (DCT factor) outputted from the inverse quantization circuit 83 is inverse-DCT-processed by the inverse DCT circuit 84 and supplied to the computing unit 85 through the block rearrangement circuit 88. When the picture data supplied from the inverse DCT circuit 84 is the data for an I-picture, the data is outputted from the computing unit 85 and supplied to and stored in a forward prediction picture section (F-P) 86a of a frame memory 86 in order to generate the prediction picture data for picture data (data for a P- or B-picture) to be later inputted to the computing unit 85. Moreover, the data is outputted to the format conversion circuit 32 (FIG. 4).

When the picture data supplied from the inverse DCT circuit 84 is the data for a P-picture using the picture data one frame before the picture data supplied from the circuit 84 as prediction picture data and the data for the forward prediction mode, the picture data (data for an I-picture) one frame before is read from the forward prediction picture section 86a of the frame memory 86 and motion-compensated by the motion compensation circuit 87 correspondingly to a motion vector outputted from the variable-length decoding circuit 82. Then, the picture data is added with the picture data (differential data) supplied from the inverse DCT circuit 84 in the computing unit 85 and outputted from the unit 85. The added data, that is, the decoded P-picture data is supplied to and stored in a backward prediction picture section (B-P) 86b of the frame memory 86 in order to generate prediction picture data for the picture data (data for a B- or P-picture) to be later inputted to the computing unit 85.

The data in the in-picture prediction mode, even if it is the data for a P-picture, is directly stored in the backward prediction picture section 86b without being processed by the computing unit 85 similarly to the data for an I-picture. Because the P-picture is a picture to be displayed after the next B-picture, it is not outputted to the format conversion circuit 32 at this point of time (as described above, the P-picture inputted after the B-picture is processed before the B-picture and transmitted).

When the picture data supplied from the inverse DCT circuit 84 is the data for a B-picture, corresponding to a prediction mode supplied from the variable-length decoding circuit 82, the picture data for an I-picture (in the case of the forward prediction mode), the picture data for a P-picture (in the case of the backward prediction mode), or the both picture data (in the case of the bidirectional prediction mode) are read from the forward prediction picture section 86a and/or the backward prediction section 86b of the frame memory 86, motion-compensated by the motion compensation circuit 87 correspondingly to a motion vector outputted from the variable-length decoding circuit 82, and a prediction picture is generated. However, unless motion compensation is necessary (in the case of the in-picture prediction mode), no prediction picture is generated.

Thus, the data motion-compensated by the motion compensation circuit 87 is added with an output of the inverse DCT circuit 84 in the computing unit 85. The added output is supplied to the format conversion circuit 32. However, the added output is not stored in the frame memory 86 because it is the data for a B-picture and it is not used to generate a prediction picture for other pictures. After the picture of the B-picture is outputted, the picture data for a P-picture is read from the backward prediction picture section 86b and supplied to the computing unit 85 through the motion compensation circuit 87. In this case, however, motion compensation is not performed.

For the decoder 31, the prediction mode switching circuit 52 of the encoder 18 in FIG. 6 and a circuit corresponding to the DCT mode switching circuit 55 are not illustrated. However, the motion compensation circuit 87 executes the processing corresponding to these circuits, that is, the processing for returning the structure in which a signal of a line in an odd field is separated from a signal of a line in an even field to the original structure in which they are mixed according to necessity. Though the processing of a luminance signal is described above, the processing of a chrominance signal is similarly performed. In this case, however, motion vectors use those obtained by halving a motion vector for a luminance signal in the vertical and horizontal directions respectively.

In the above-described motion picture encoding apparatus 1 shown in FIG. 4, the prefilter 19 is used to remove noises from an input video signal, improve the encoding efficiency of the encoding apparatus 1, and decrease information content down to a predetermined value. Though the prefilter 19 includes various types with various characteristics, which is the optimum filter depends on the characteristic of an input video signal, the state of a motion picture encoding apparatus for encoding, a recording medium, or a transmission line.

For example, when an encoding bit rate is low, a decoded picture is extremely deteriorated and therefore, it is necessary to strongly apply a filter for improving the encoding efficiency in order to compensate the deterioration of the picture. However, when the encoding bit rate is high, the decoded picture maintains a high picture quality. In this case, if the same filter as that used for the low bit rate is used, the picture quality is deteriorated. Therefore, the existing motion picture filtering and encoding methods have a problem that a prefilter cannot always use the optimum filter.

SUMMARY OF THE INVENTION

In view of the foregoing, an object of this invention is to provide a motion picture encoding method for improving the encoding efficiency by properly switching filters in accordance with the property of a motion picture or the condition for encoding.

The foregoing object and other objects of the invention have been achieved by the provision of a motion picture encoding method for encoding a motion picture signal by using a predetermined prediction video signal, applying a predetermined operation to the encoded signal, quantizing the signal obtained by the operation, and variable-length-encoding the quantized signal; the method comprising the steps of encoding the same motion picture signal a plurality of times, measuring the property of the motion picture signal in accordance with the information at the time of the encoding, and filtering the motion picture signal correspondingly to the property of the measured motion picture signal.

Moreover, the present invention uses a motion picture encoding method for encoding a motion picture signal by using a predetermined prediction video signal, applying a predetermined operation to the encoded signal, quantizing the signal obtained by the operation, and variable-length-encoding the quantized signal; the method comprising the steps of encoding the same motion picture signal a plurality of times, measuring the property of the motion picture signal in accordance with the information for the encoding, and filtering the motion picture signal in accordance with the property of the measured motion picture signal at the final-time encoding of the motion picture signal so as to encode it.

Furthermore, the present invention uses a motion picture encoding method for encoding a motion picture signal by using a predetermined prediction video signal, applying a predetermined operation to the encoded signal, quantizing the signal obtained by the operation, and variable-length-encoding the quantized signal; the method comprising the steps of encoding the same motion picture signal a plurality of times, measuring the property of the motion picture signal in accordance with the information for the encoding, filtering the motion picture signal in accordance with the property of the measured motion picture signal at the final-time encoding of the motion picture signal, and determining an encoding bit rate for the final-time encoding in accordance with the property of the motion picture signal and the characteristic of the filter used for the filtering so as to encode the motion picture signal at variable rates.

Furthermore, the present invention uses a motion picture encoding apparatus 1 for encoding a motion picture signal by using a predetermined prediction video signal, applying a predetermined operation to the encoded signal, quantizing the signal obtained by the operation, and variable-length-encoding the quantized signal, the apparatus comprising: measurement means 20 for encoding the same motion picture signal a plurality of times and for measuring the property of the motion picture signal in accordance with the information at the time of the encoding; and filter means 19, 21 for filtering the motion picture signal correspondingly to the property of the measured motion picture signal.

Furthermore, the present invention uses a motion picture encoding apparatus 1 for encoding a motion picture signal by using a predetermined prediction video signal, applying a predetermined operation to the encoded signal, quantizing the signal obtained by the operation, and variable-length-encoding the quantized signal, the apparatus comprising: measurement means 20 for encoding the same motion picture signal a plurality of times and measuring the property of the motion picture signal in accordance with the information at the time of the encoding; filter means 19, 21 for filtering the motion picture signal correspondingly to the property of the motion measured picture signal at the final-time encoding of the motion picture signal; and encoding bit rate determination means 22 for determining an encoding bit rate at the final-time encoding in accordance with the property of the motion signal and the characteristic of the filter used for the filtering.

As described above, the present invention realizes a motion picture encoding method making it possible to adaptively switch filters in accordance with the property of a motion picture or the condition for encoding and improve the encoding efficiency as the result of encoding the motion picture a plurality of times, optimizing an encoding parameter for encoding, measuring the property of the motion picture signal, performing filtering by using the encoding parameter or the property of the measured motion picture signal and thereby optimizing the filter characteristic only for the final-time encoding, and practically generating and outputting an encoding signal (bit stream).

Moreover, when performing encoding at variable rates, it is possible to perform the optimum filtering in accordance with an encoding bit rate. Thus, it is possible to realize a motion picture encoding method making it possible to adaptively switch filters in accordance with the property of a motion picture or the condition for encoding and improve the encoding efficiency.

The nature, principle and utility of the invention will become more apparent from the following detailed description when read in conjunction with the accompanying drawings in which like parts are designated by like reference numerals or characters.

BRIEF DESCRIPTION OF THE DRAWINGS

In the accompanying drawings:

FIGS. 2A and 2B are schematic diagrams for explaining picture types for compressing motion picture signals;

FIGS. 11A and 11B are schematic diagrams for explaining factors of the two-dimensional low-pass filter in FIG. 10;

DETAILED DESCRIPTION OF THE EMBODIMENT

Preferred embodiments of this invention will be described with reference to the accompanying drawings:

(1) First Embodiment

Figure 12:
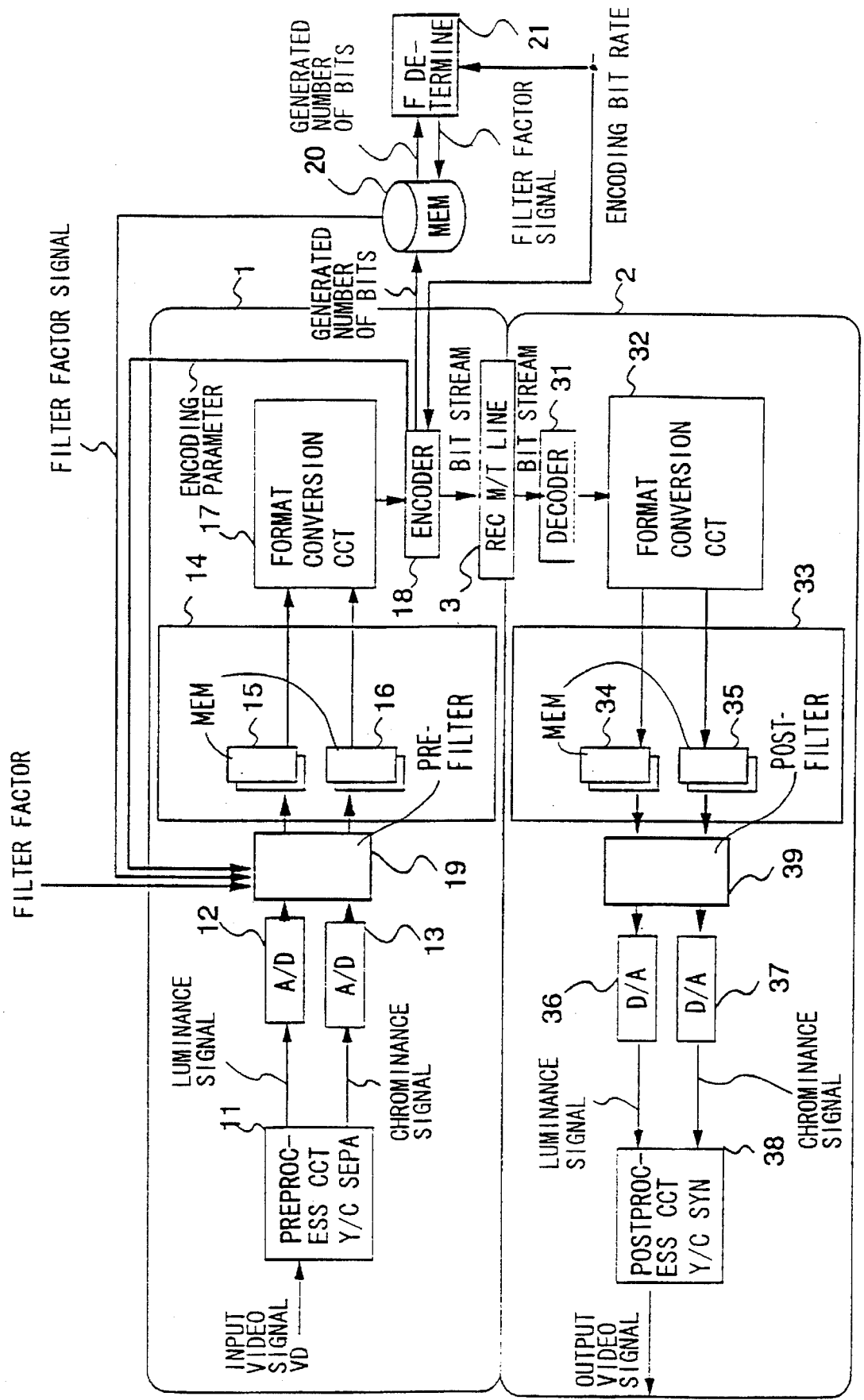
FIG. 12 is a block diagram showing the structure of the motion picture encoding/decoding apparatus of the first embodiment of the present invention.

FIG. 12 shows the motion picture encoding/decoding apparatus of the first embodiment of the present invention. This embodiment is used when an encoding bit rate is fixed (fixed rate encoding). First, in the encoding apparatus 1, an input video signal VD is inputted to a preprocessing circuit 11 in which a luminance signal and a color signal (in the case of the example, a chrominance signal) are separated from each other and they are analog-to-digital-converted by an analog-to-digital (A/D) converters 12 and 13 respectively.

The video signal analog-to-digital-converted to digital signals by the A/D converters 12 and 13 is inputted to and filtered by a prefilter 19 and then supplied to and stored in a frame memory 14. The frame memory 14 stores the luminance signal in a luminance-signal frame memory 15 and the chrominance signal in a chrominance signal frame memory 16. In this case, when the input video signal is digital video signals separated to the luminance signal and the color signal, the preprocessing circuit 11 and the A/D converters 12 and 13 are unnecessary. The prefilter 19 performs the processing for improving the encoding efficiency. The prefilter 19 is described later in detail.

Figures 1A, 1B:
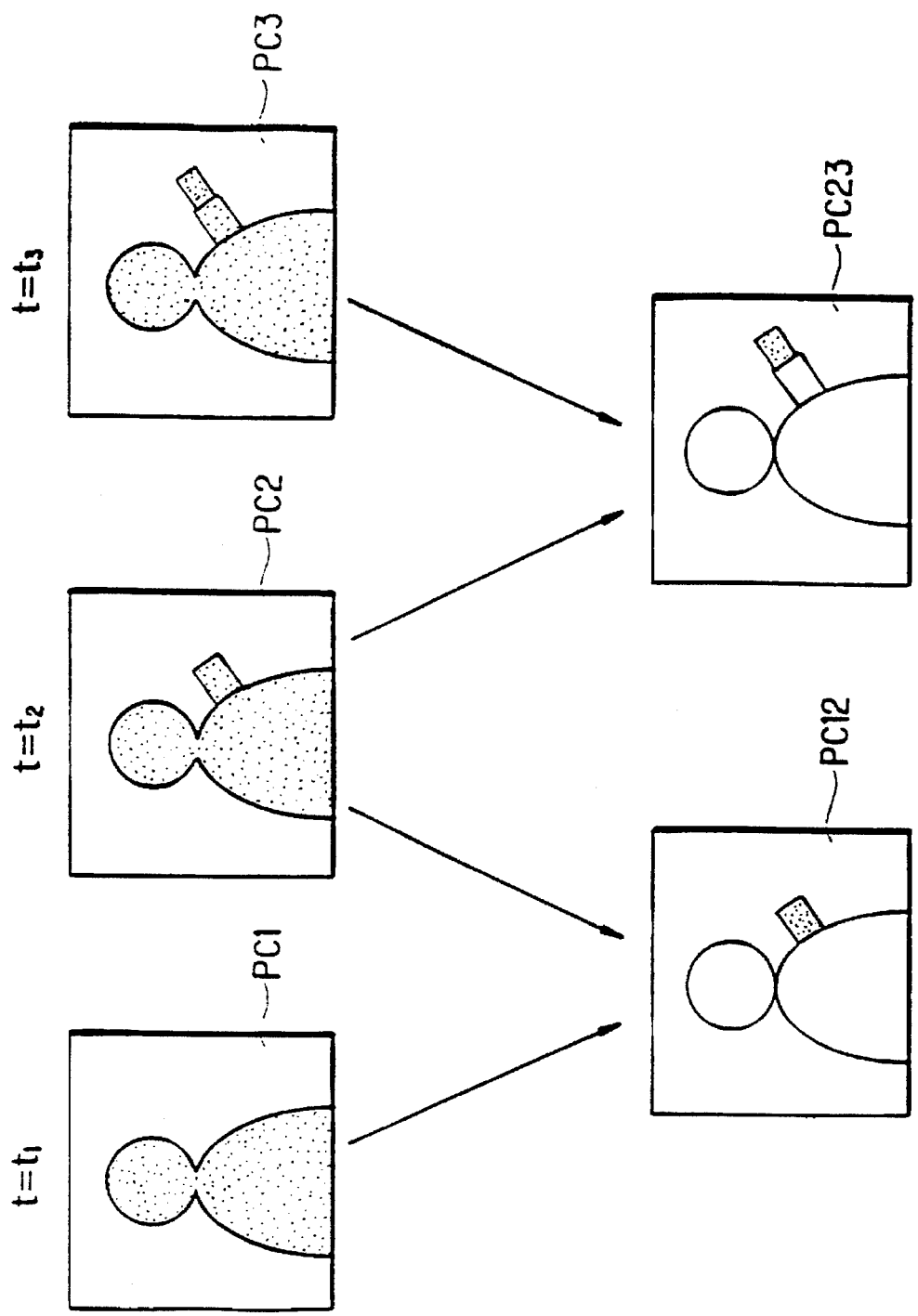
FIGS. 1A and 1B are schematic diagrams for explaining a high-efficiency motion picture signal encoding theory using a frame correlation.
Figures 3A, 3B:
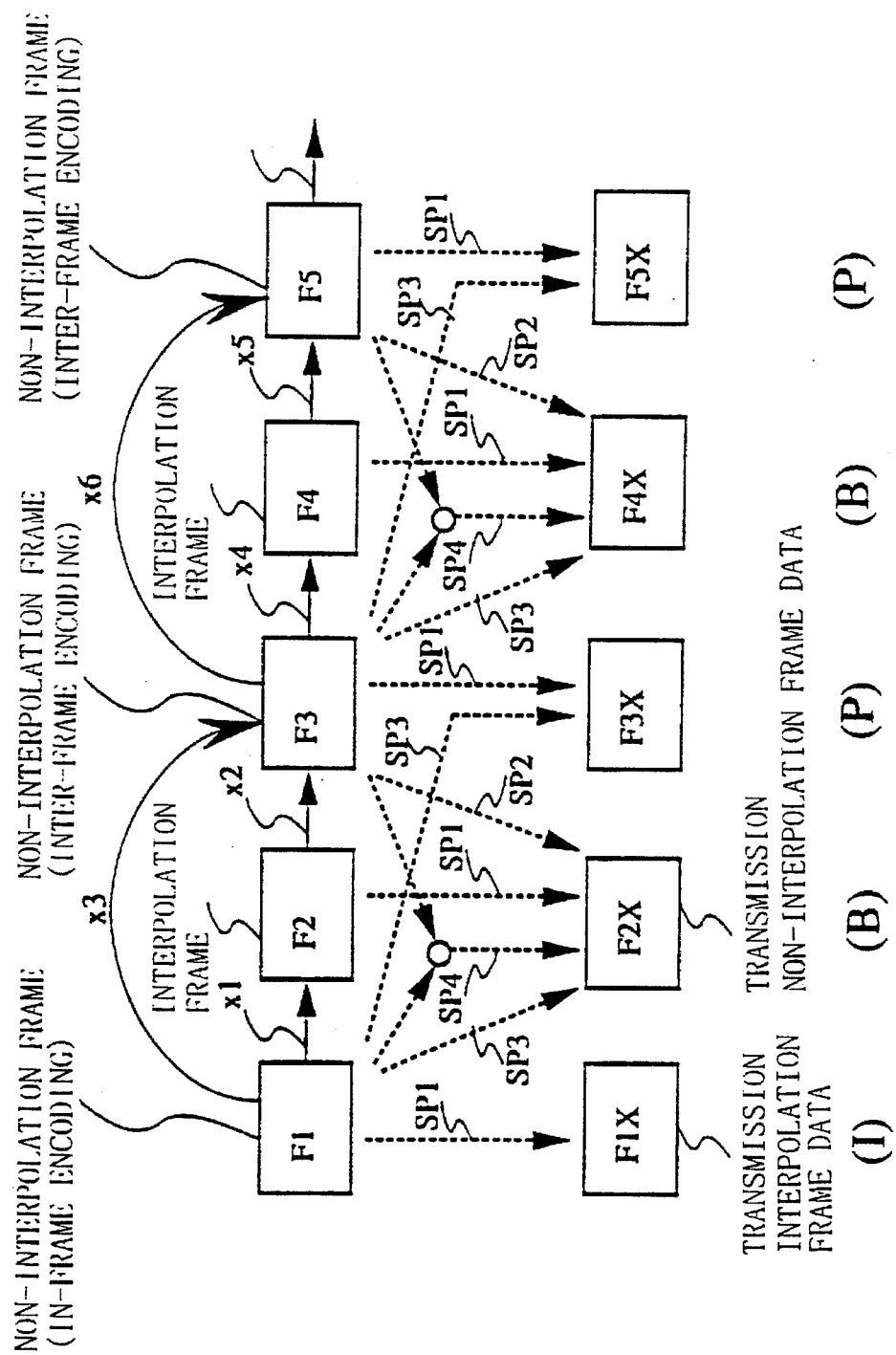
FIGS. 3A and 3B are schematic diagrams for explaining a theory of a motion picture signal encoding method.
Figure 4:
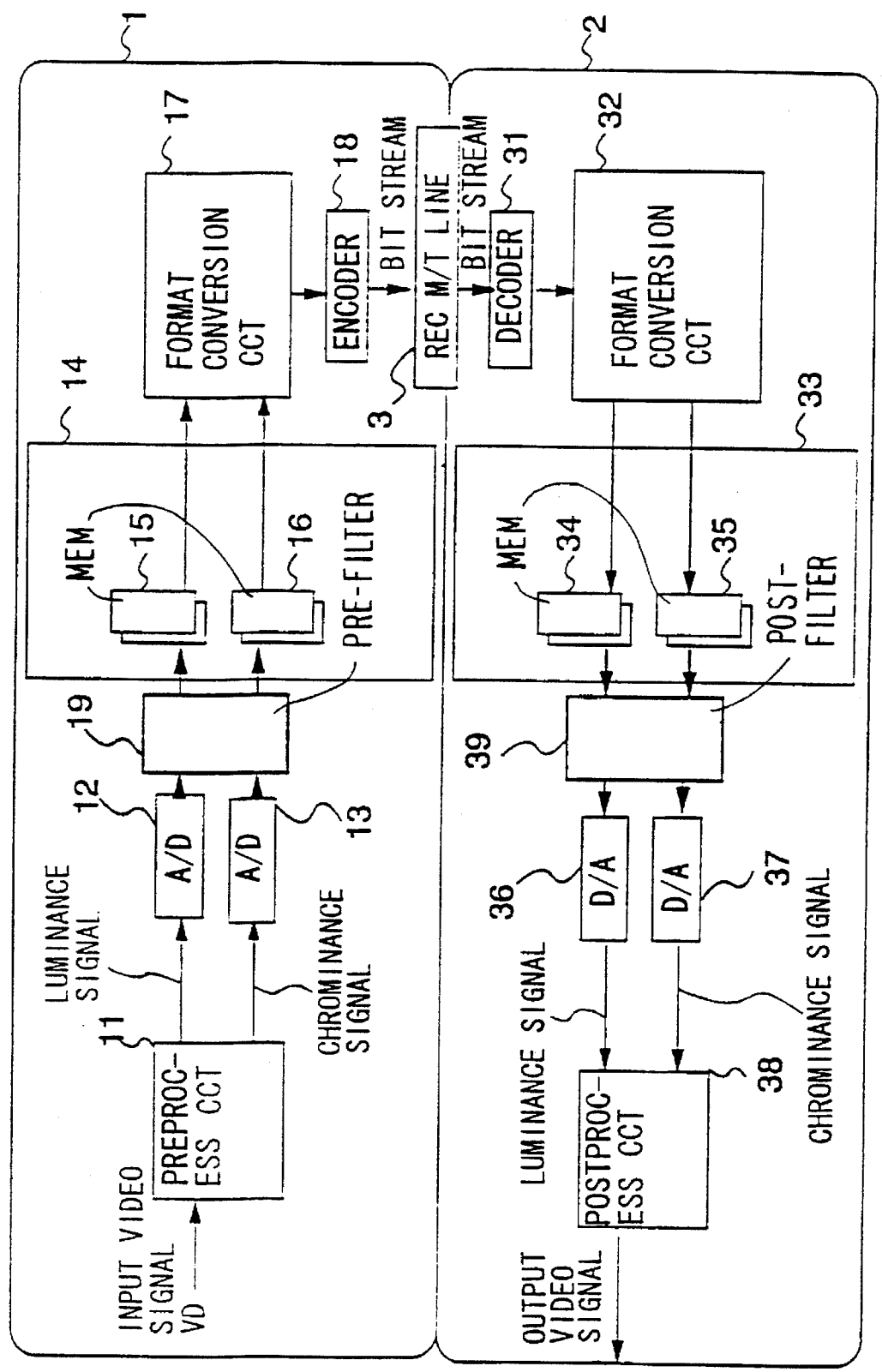
FIG. 4 is a block diagram showing the structure of an existing motion picture encoding/decoding apparatus.
Figure 5A:
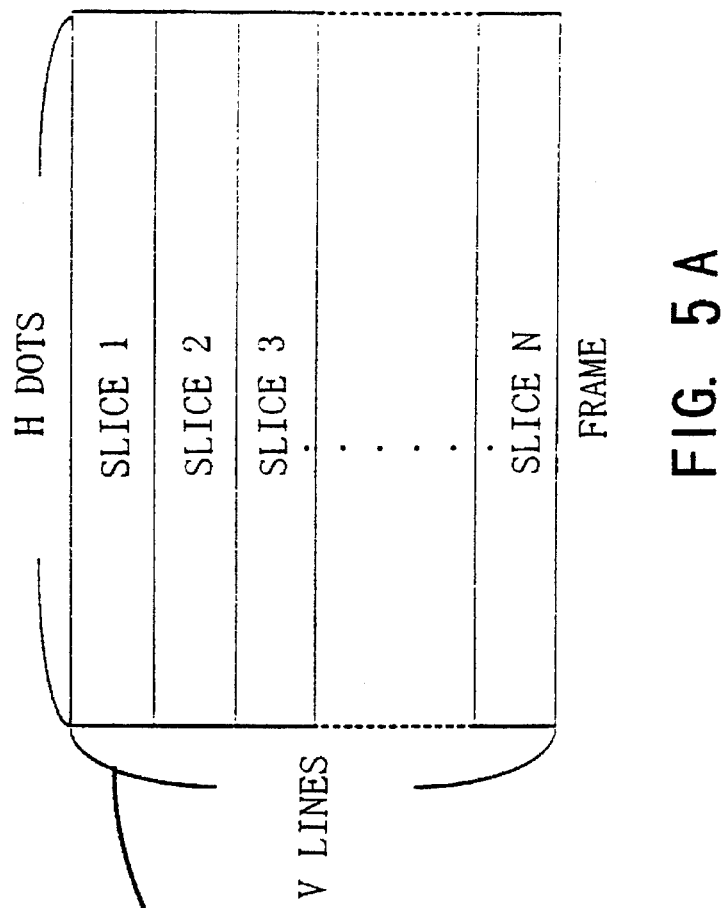
FIGS. 5A to 5C are schematic diagrams showing the structures of picture data for explaining operations of a format conversion circuit.
Figure 5B:
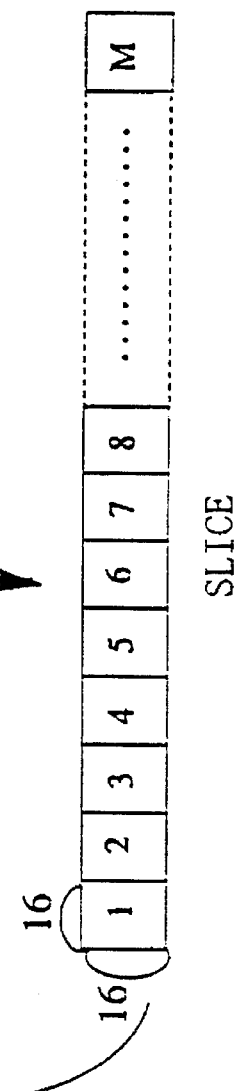
Figure 5C:
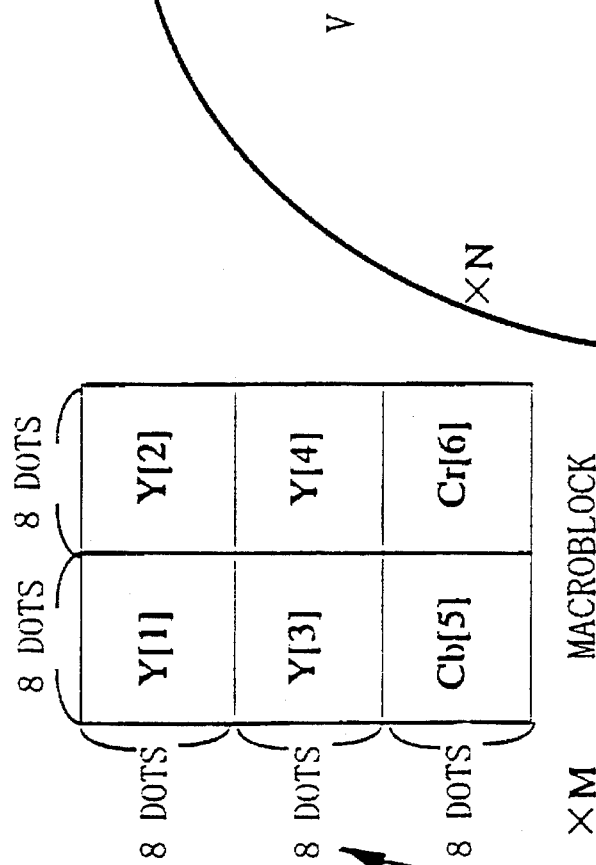

A format conversion circuit 17 converts a frame-format signal stored in the frame memory 14 to a block-format signal. That is, as shown in FIGS. 5A to 5C, the video signal stored in the frame memory 14 is regarded as frame-format data in which a line having H dots is collected up to V lines. The format conversion circuit 17 divides the signal of one frame into M slices every 16 lines.

Then, each slice is divided into M macroblocks. Each macroblock comprises a luminance signal corresponding to 16×16 pixels (dots) and the luminance signal is further divided into blocks Y[1] to Y[4] every 8×8 dots. Moreover, a Cb signal of 8 ×8 dots and a Cr signal of 8×8 dots correspond to the luminance signal of 16×16 dots. Thus, the data converted to a block format is supplied from the format conversion circuit 17 to an encoder 18 in which the data is encoded. Details of encoding are described later in detail by referring to FIG. 13. The signal encoded by the encoder 18 is outputted to a transmission line as a bit stream and then recorded in, for example, a recording medium 3.

To encode a video signal, the encoding apparatus 1 of this embodiment inputs a picture a plurality of times and outputs a bit stream only at the final time. Therefore, the encoding apparatus serves as a measuring instrument for measuring the property of an input video signal before outputting the bit stream. In the case of this embodiment, a case is shown in which execution of encoding is divided into twice (2 pass coding). The same is applied to a case in which execution of encoding is divided into three times or more.

An encoding mode signal is inputted to the encoding apparatus 1 from an external unit. This signal is a flag signal showing the first or second encoding. This encoding mode signal is inputted to the encoding apparatus 1 by operating a switch attached to the apparatus. Moreover, the encoding mode signal can be inputted to the apparatus from an external unit such as a personal computer as a modification of the above case. An example of the encoding mode signal is described below. To perform encoding twice, it is enough that the encoding mode signal consists of a one-bit signal. For example, when the encoding mode signal is set to "0", it shows the first-time encoding. When the signal is set to "1", it shows the second-time encoding. Though the encoding mode signal can be a signal of two bits or more, this case is the same as the case in which the signal consists of one bit.

First, the first-time encoding is described below. When the encoding mode signal shows the first-time encoding, encoding is performed by fixing a quantization scale QS. In this case, the generated number of bits is measured. Measurement of the generated number of bits is performed, for example, every frame. Moreover, it is possible to perform the measurement every GOP. The generated number of bits is transmitted to and stored in a memory 20.

The generated number of bits when the quantization scale QS is fixed serves as a parameter showing the difficulty of encoding (compression). That is, a picture with less generated number of bits at the same quantization scale QS is a picture which can easily be encoded (compressed) and a picture with more generated number of bits at the same quantization scale QS is a picture which cannot easily be encoded (compressed). Therefore, in this embodiment, the generated number of bits which is encoded when the quantization scale QS is fixed is referred to as "Difficulty". A bit stream encoded at this point of time is not outputted. Also in this case, the prefilter 19 does not perform processing but it directly outputs an input signal. As a modification of the above case, it is also possible to perform processing by using a normally-constant filter factor.

After the first-time encoding ends, a factor determination circuit 21 determines the factor of a filter used for the prefilter 19. Moreover, the factor determination circuit 21 determines the characteristic of the filter in accordance with an encoding bit rate and Difficulty. The filter factor is previously designed outside. In the case of this embodiment, a case is described in which N filter factors are previously designed.

The factor determination circuit 21 selects an optimum filter factor out of the N previously-designed filter factors and outputs a filter factor signal. The filter factor signal is set for each frame. When Difficulty is measured for each GOP, the filter factor signal is set for each GOP. That is, in this case, the filter factor signal for each frame in the GOP has the same value. The filter factor signal is recorded in the memory 20, and read out of the memory 20 at the second-time encoding to be mentioned later and outputted to the prefilter 19.

Then, a filter factor determining method is described below. The factor determination circuit 21 determines a filter factor from Difficulty for each frame and the number of bits "alloc-bit" allocated to the frame. The number of bits allocated to each frame is described below. For the fixed rate encoding, an encoding bit rate "bit-rate" shows the number of bits per sec. A frame rate "frame-rate" shows the number of frames per sec. Therefore, the number of bits "alloc-bit" allocated to each frame is obtained from the following expression.

$$\text{alloc-bit} = \text{bit-rate} / \text{frame-rate} \qquad (2)$$

The encoding bit rate "bit-rate" and the frame rate "frame-rate" are recorded in the sequence header "sequence-header" of an encoding bit stream.

Figure 14:
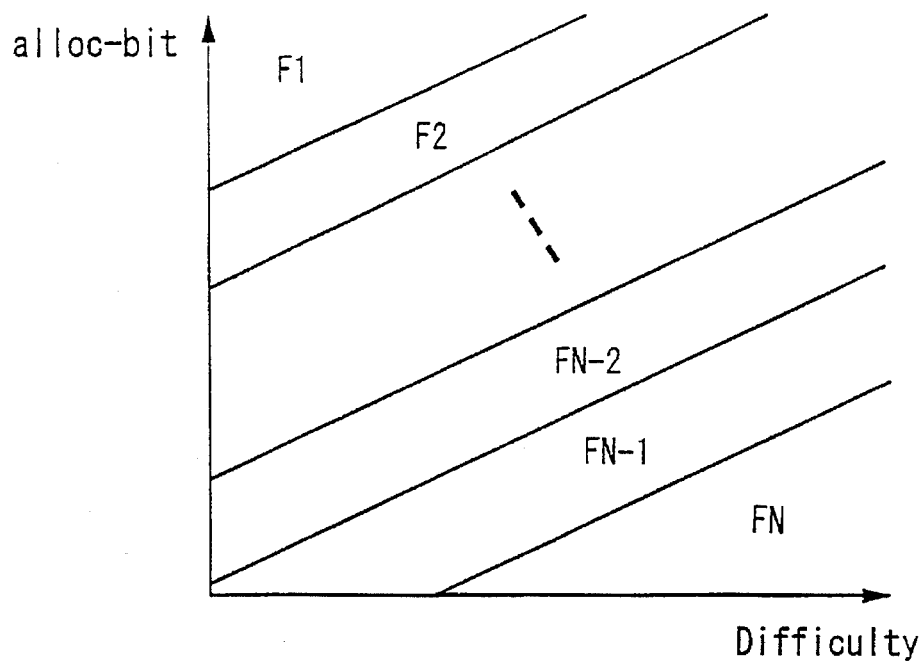
FIG. 14 is a characteristic curve for explaining a filter-factor determining method.
Figure 15:
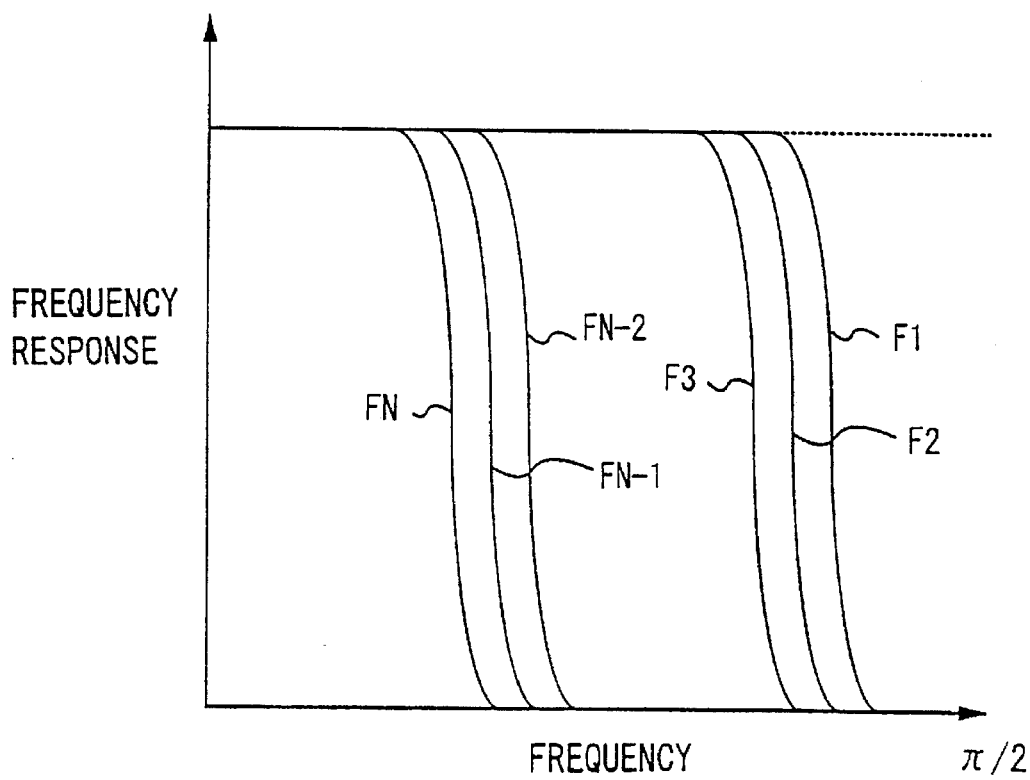
FIG. 15 is a characteristic curve for explaining frequency characteristics of a filter factor.

Even in the case of the same Difficulty, the difficulty for encoding depends on the allocated number of bits "alloc-bit". Even for a large generated number of bits Difficulty, a weak filter is enough when the number of bits "alloc-bit" is large enough. However, when the number of bits "alloc-bit" is small, a strong filter must be used. In this case, the threshold depends on Difficulty. FIG. 14 shows a relation between Difficulty, number of bits "alloc-bit", and selected filter factor. There are N filter factors from F1 to FN. In this case, F1 represents the weakest filter and FN represents the strongest filter. FIG. 15 shows frequency characteristics for filter factors of F1 to FN. In this case, a weak filter is a filter with the widest frequency pass band and a strong filter is a filter with the narrowest frequency pass band.

In this case, though the factor determination circuit 21 performs processing after the first-time encoding. As a modification of the processing, however, it is also possible to record a filter factor signal in the memory 20 by performing the processing while performing the first-time encoding. Moreover, it is possible to realize the factor determination circuit 21 by an external unit such as a personal computer. The filter factor signal is a flag showing which filter factor is used among N filter factors.

Then, the second-time encoding is described below. When an encoding mode signal shows the second-time encoding, an encoder performs encoding while controlling a quantization scale (QS) so that an encoding bit rate is kept constant. In this case, the prefilter 19 reads the filter factor signal of each frame from the memory 20, changes a filter factor correspondingly to the generated number of bits, and performs filtering. Therefore, the optimum filtering can always be applied to each frame.

Figure 16:
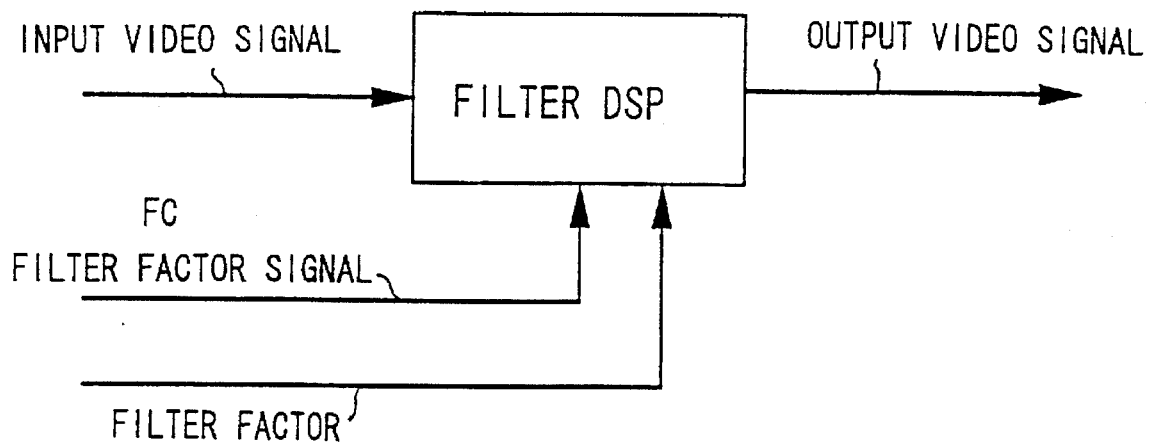
FIGS. 16A and 16B are block diagrams showing the structure of a variable-factor filter circuit.
Figure 16:
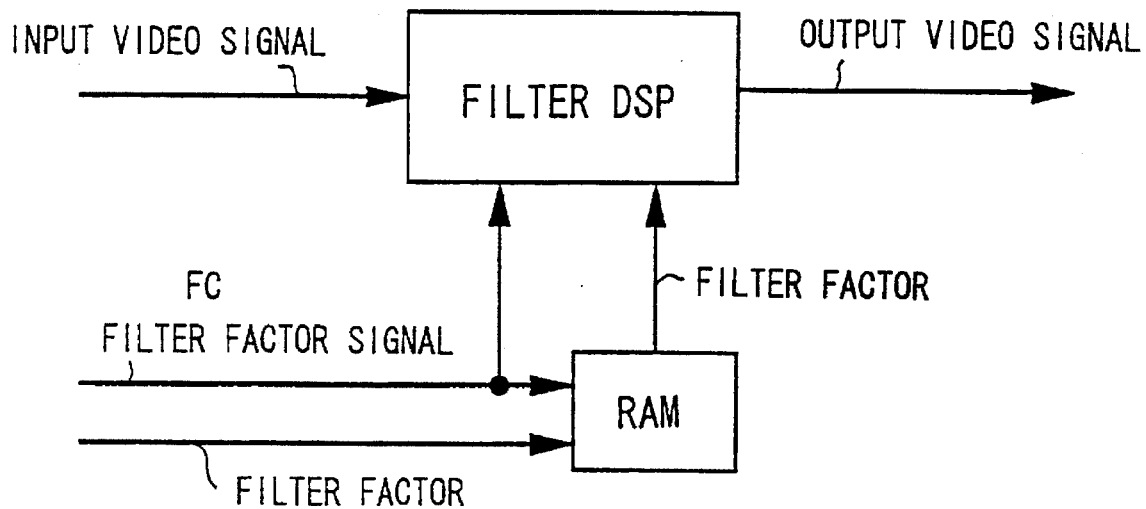

Then, the prefilter 19 is described below by referring to FIGS. 16A and 16B. The prefilter 19 can be realized by using, for example, a filter DSP. The prefilter 19 includes the following two types of structures because of the difference between filter factor control methods. First, the first prefilter structure is described below by referring to FIG. 16A. In the case of the first prefilter structure, a filter factor is read by the filter DSP for each frame. In this case, the filter factor is inputted from an external unit.

Moreover, as a modification of the above case, it is possible to previously record a filter factor in the memory 20 and then read the filter factor from the memory 20 together with a filter factor signal FC. When the filter DSP receives the filter factor signal FC, it reads a filter factor shown by the filter factor signal FC. FIG. 16B shows the second filter structure. In the case of the second prefilter structure, a filter factor is read from an external unit when the whole encoding apparatus is initialized and stored in a memory (RAM). In this case, when N filter factors are present as described above, the N filter factors are all stored in the RAM. When the filter factor signal FC is inputted, a predetermined filter factor is read from the RAM.

Figure 6:
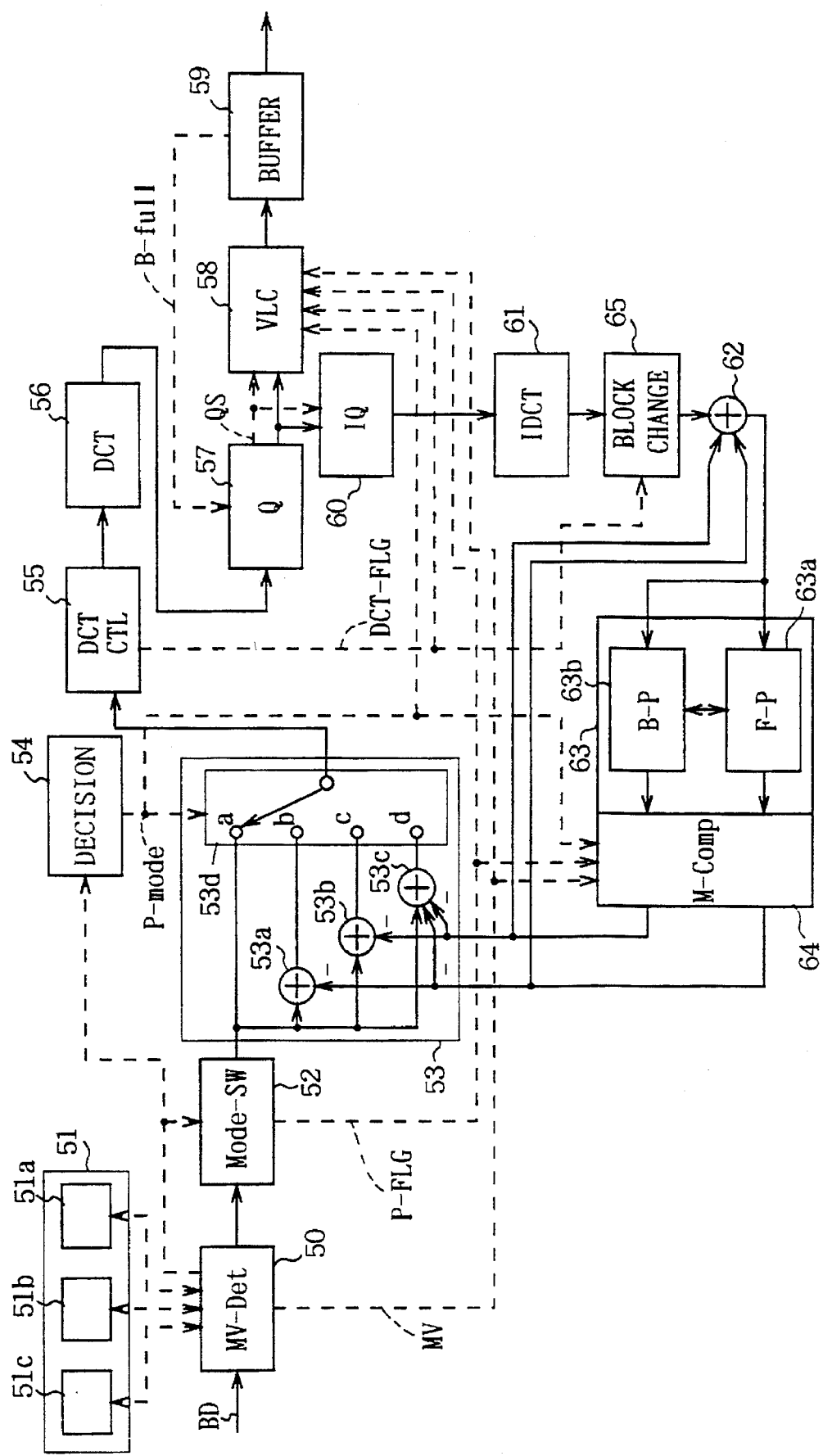
FIG. 6 is a block diagram showing an encoder of the motion picture encoding/decoding apparatus in FIG. 4.
Figures 7A, 7B:
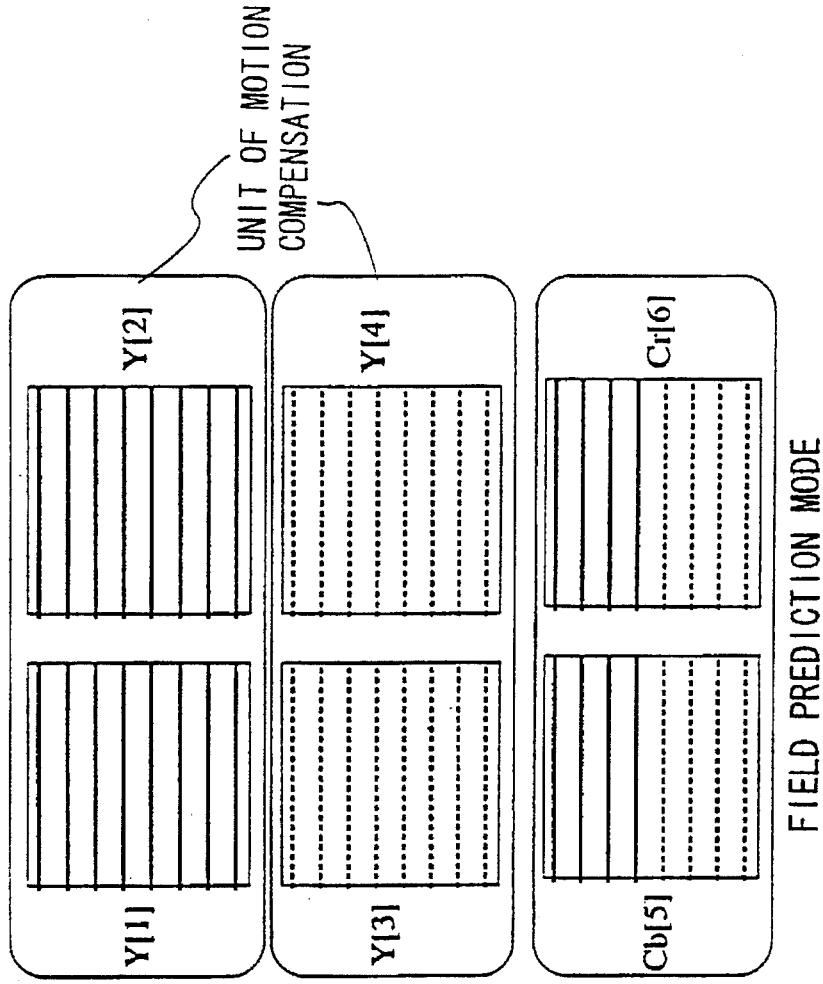
FIGS. 7A and 7B are schematic diagrams for explaining operations of a prediction mode switching circuit of an encoder.
Figure 8A:
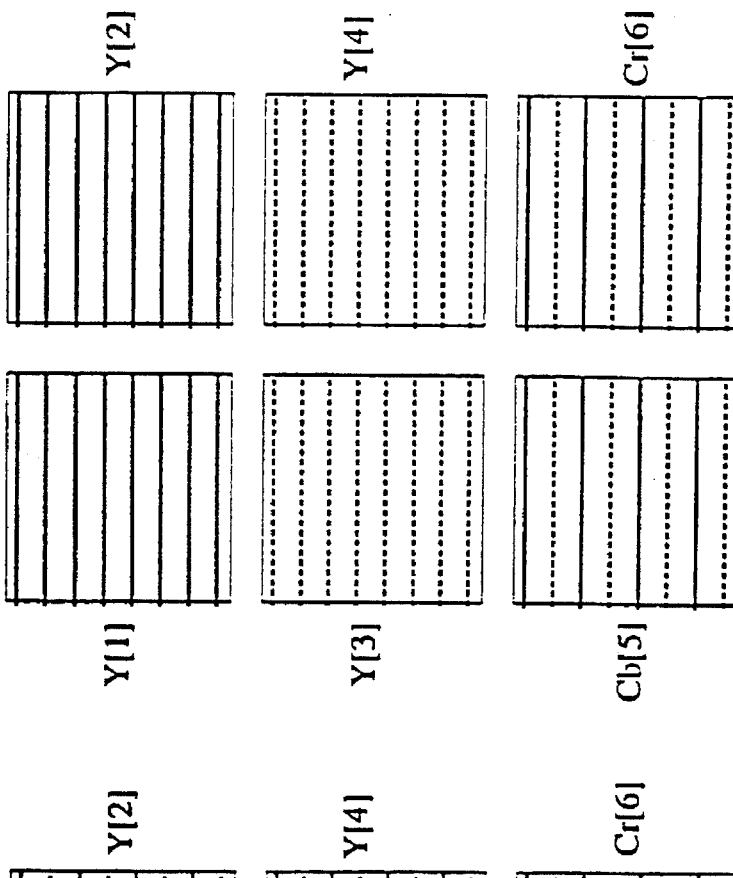
FIGS. 8A and 8B are schematic diagrams for explaining operations of a DCT mode switching circuit of an encoder.
Figure 8B:
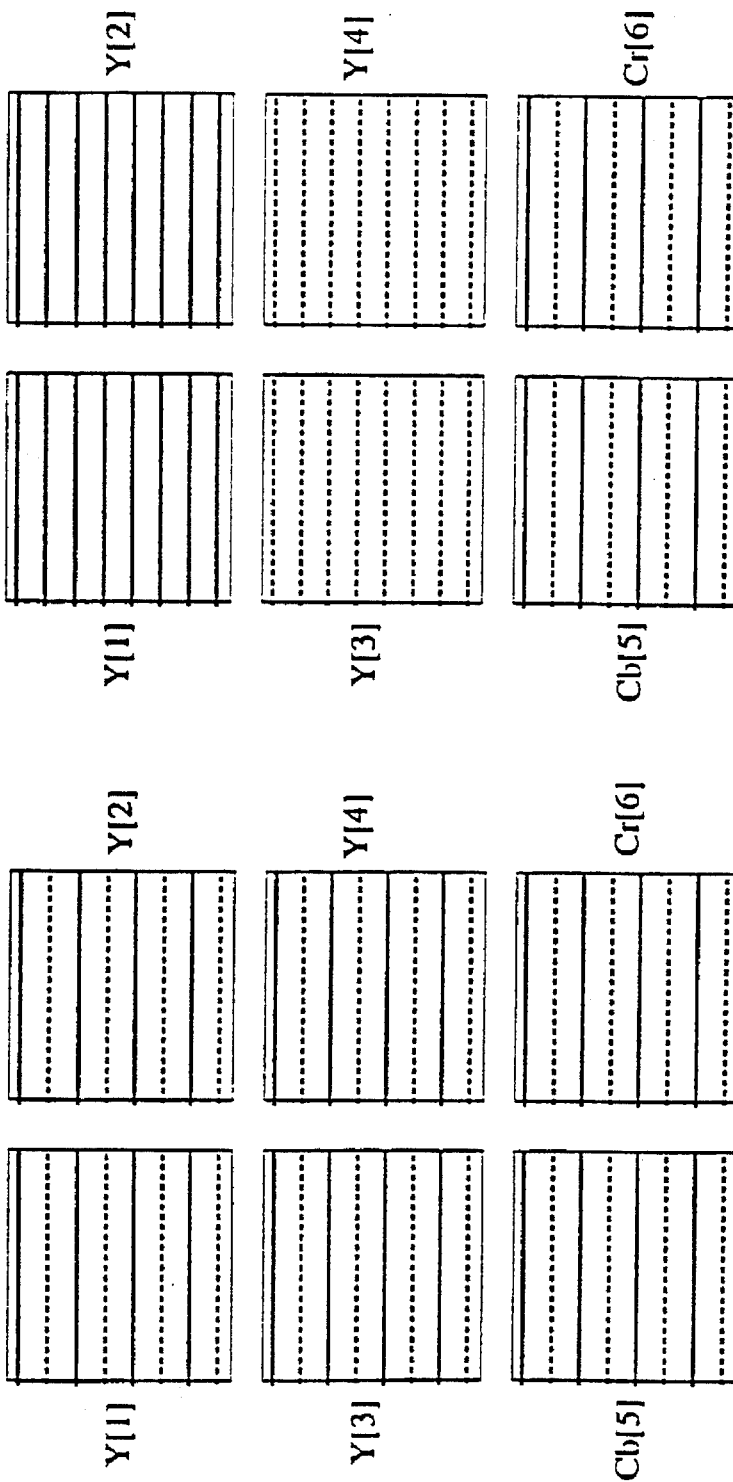
Figure 9:
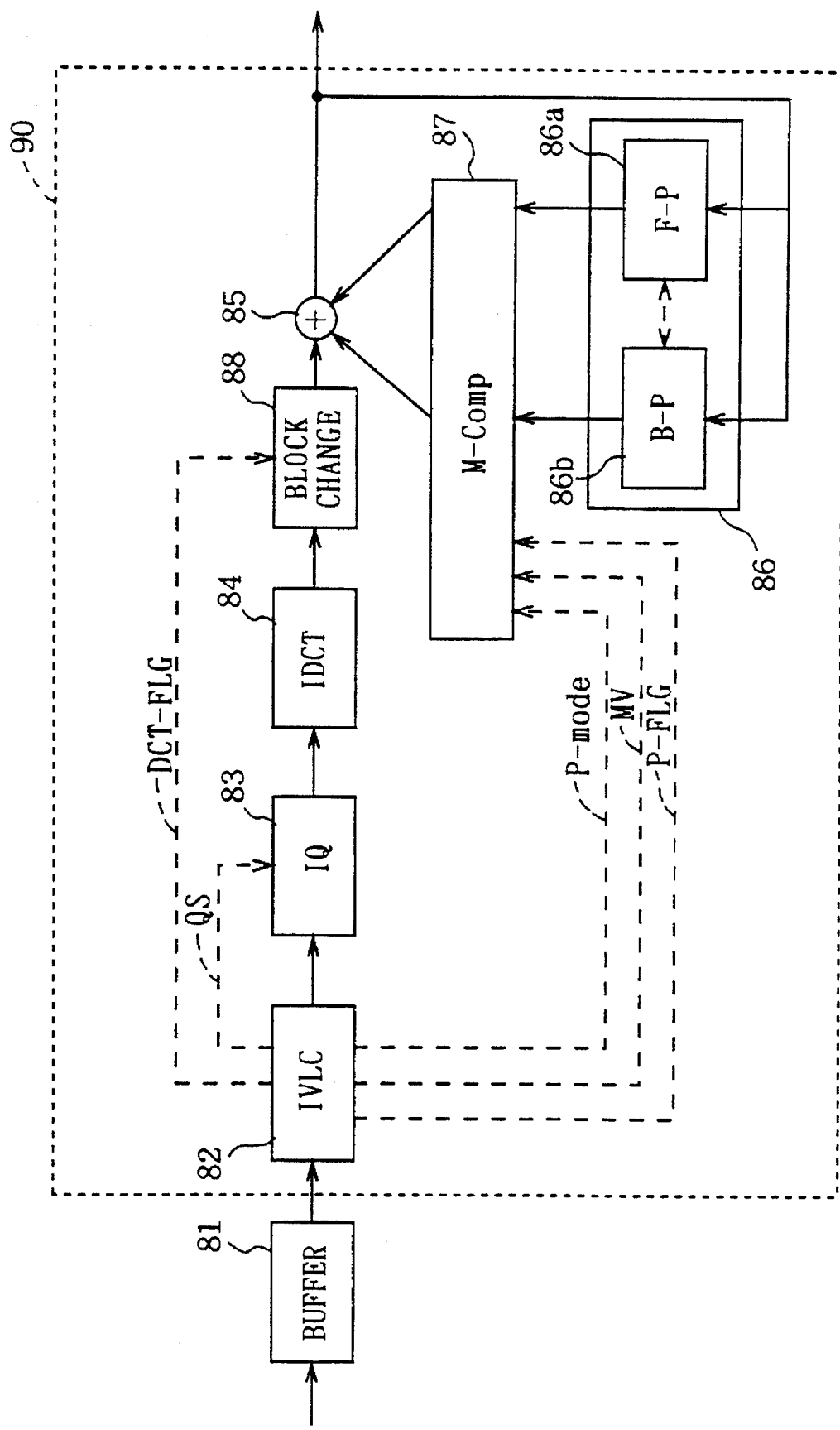
FIG. 9 is a block diagram showing the structure of a decoder of the motion picture encoding/decoding apparatus in FIG. 4.
Figure 10:
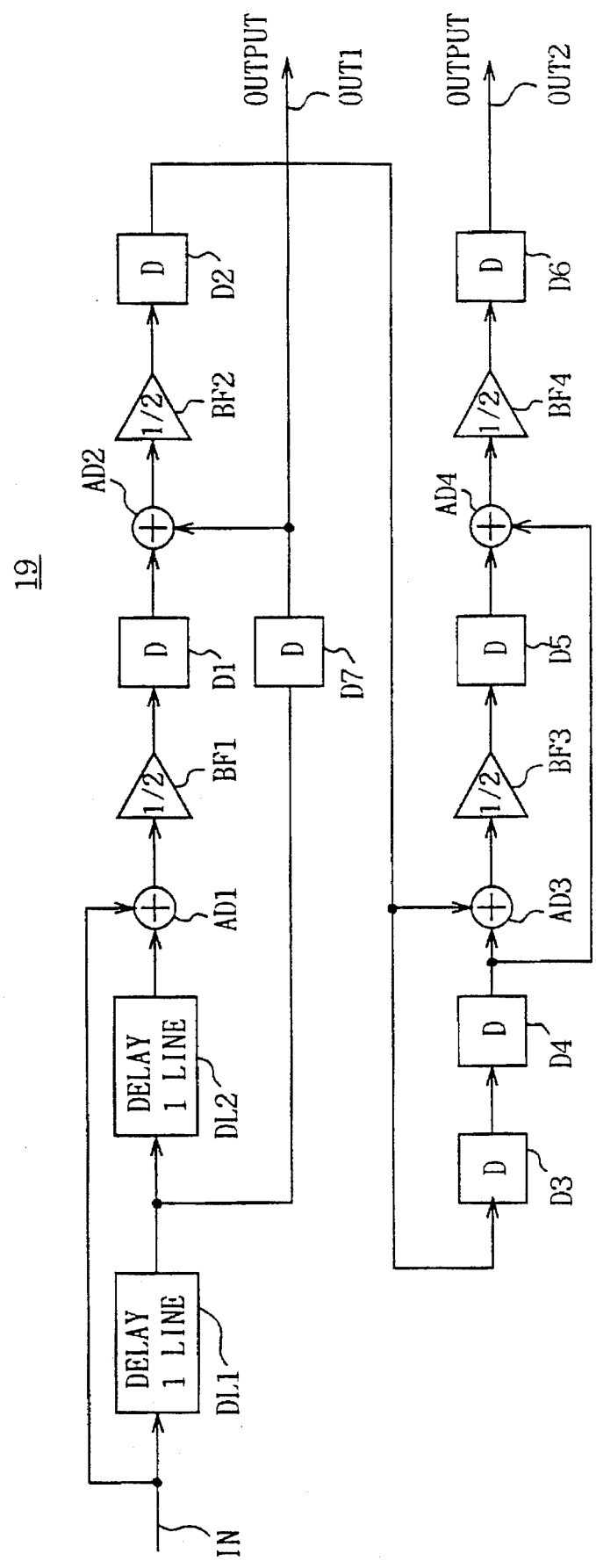
FIG. 10 is a connection diagram showing the structure of a two-dimensional low-pass filter serving as a prefilter/postfilter of the motion picture encoding/decoding apparatus in FIG. 4.
Figure 13:
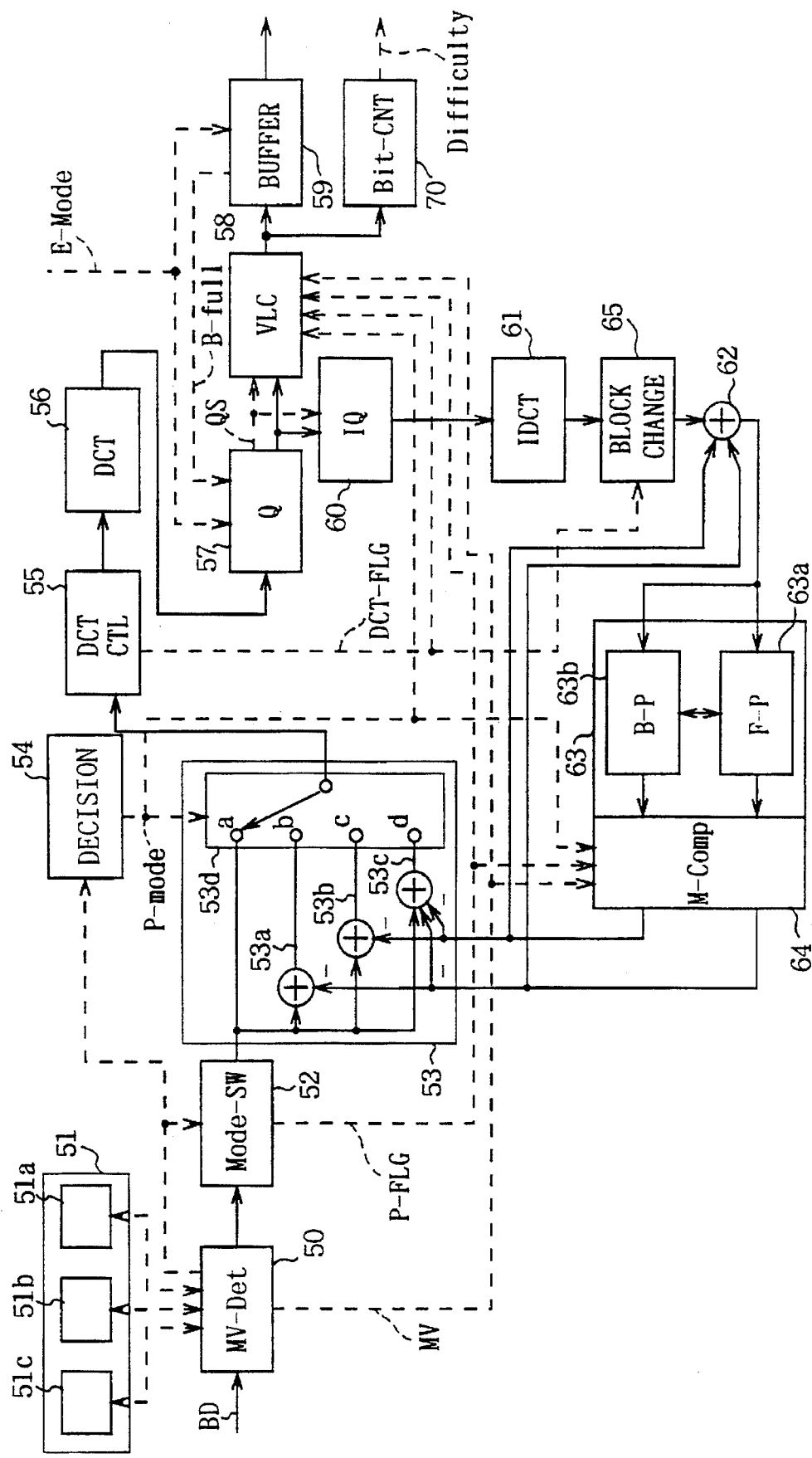
FIG. 13 is a block diagram showing the structure of an encoder.

Then, the encoder 18 is described below by referring to FIG. 13. Though details of the encoder are same as those of the existing encoder described in FIG. 6, the following contents are different from those of the existing encoder. Firstly, the encoder of this embodiment has a bit counter (Bit-cnt) 70. A bit stream outputted from a variable-length encoding circuit 58 is inputted to the bit counter 70. The bit counter Y0 measures Difficulty for each frame. The measured Difficulty is inputted to the memory 20 in FIG. 12.

Secondly, in the case of the encoder of this embodiment, an encoding mode (E-mode) is inputted to a quantization circuit 57 and a transmission buffer 59 from an external unit. When the encoding mode is set to "0", it shows the first-time encoding. In this case, the quantization circuit 57 sets a quantization scale (QS) to a fixed value. The transmission buffer 59 does not output a bit stream. When the encoding mode is set to "1", it shows the second-time encoding and the quantization circuit 57 controls the quantization scale (QS) in accordance with an encoding bit rate as usual. Moreover, the transmission buffer 59 outputs a bit stream to the recording medium or transmission line in FIG. 12.

The data reproduced from the recording medium 3 is supplied to a decoder 31 of a decoding apparatus 2 and decoded there. The data decoded by the decoder 31 is inputted to a format conversion circuit 32 and converted there from a block format to a frame format. Then, a frame-format luminance signal is supplied to and stored in a luminance-signal frame memory 34 of a frame memory 33 and a chrominance signal is supplied to and stored in a chrominance-signal frame memory 35.

The luminance signal and chrominance signal read out of the luminance-signal frame memory 34 and the chrominance-signal frame memory 35 are processed by a postfilter, and thereafter digital-to-analog-converted by digital-to-analog (D/A) converters 36 and 37 respectively, supplied to a postprocessing circuit 38, and synthesized. Then, the signals are outputted to a not-illustrated display such as a CRT to be displayed.

According to the above structure, it is possible to adaptively switch filters in accordance with the property of a motion picture or the condition for encoding and improve the encoding efficiency as the result of encoding the motion picture a plurality of times, optimizing an encoding parameter for encoding, measuring the property of the motion picture signal, performing filtering by using the encoding parameter or the property of the measured motion picture signal and thereby optimizing the filter characteristic only for the final-time encoding, and practically generating and outputting an encoding signal (bit stream). Also when performing encoding at variable rates, the optimum filtering is performed in accordance with an encoding bit rate.

(2) Second Embodiment

Figure 17:
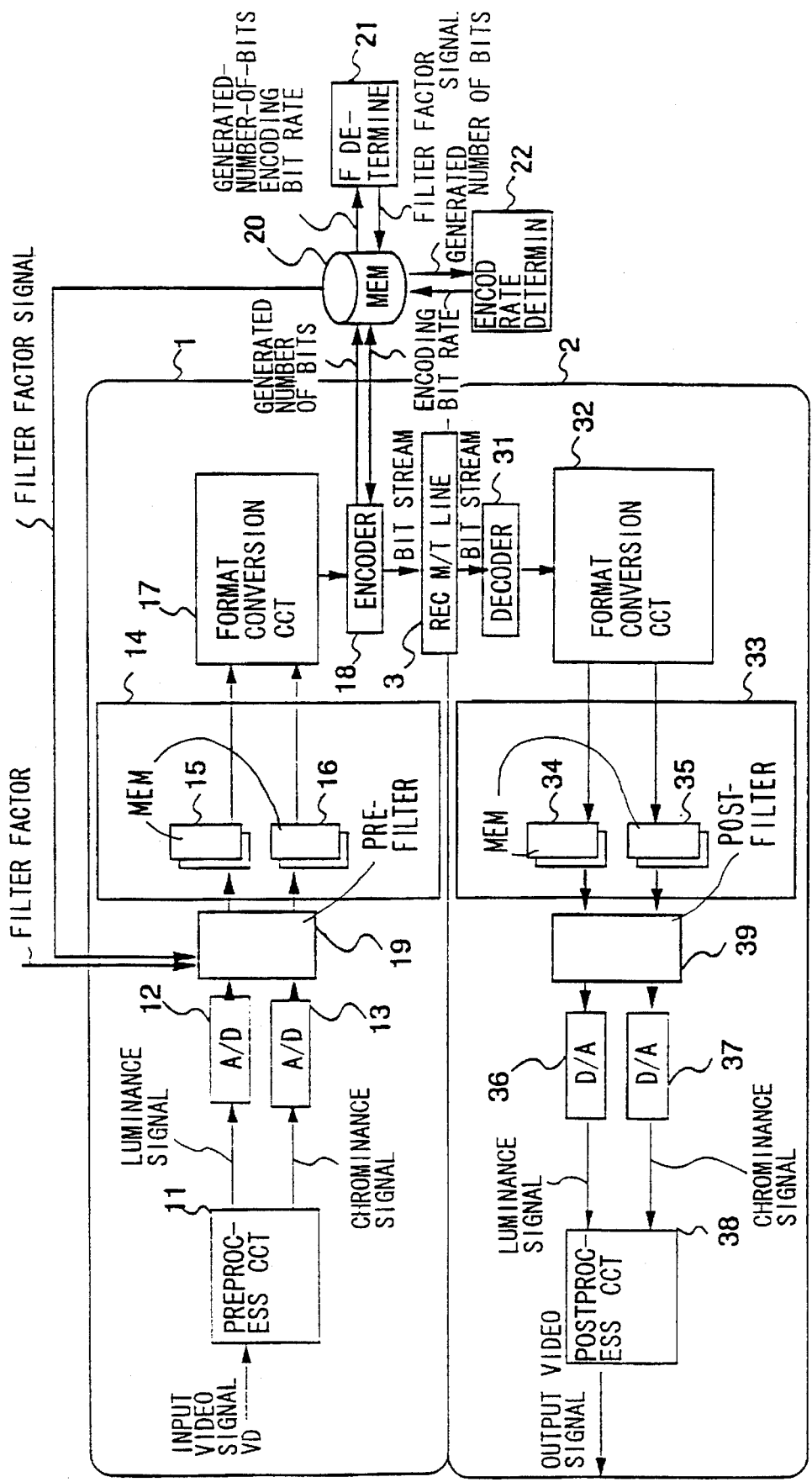
FIG. 17 is a block diagram showing the structure of the motion picture encoding/decoding apparatus of the second embodiment of the present invention.

FIG. 17 shows the structure of the motion picture encoding/decoding apparatus of the second embodiment of the present invention. The second embodiment is used when an encoding bit rate is variable (variable rate encoding). The second embodiment is the same as the above first embodiment except the following points. That is, the encoding apparatus of the second embodiment has an encoding rate determination circuit 22. The encoding rate determination circuit 22 determines the number of bits to be allocated to each frame or GOP after the first-time encoding.

In the case of the first embodiment, the number of bits "alloc-bit" to be allocated to each frame is always constant as shown in the expression (2). In the case of the second embodiment, however, the number of bits "alloc-bit" adaptively changes. The number of bits "alloc-bit" to be allocated to each frame is calculated from Difficulty and the total number of frames in a sequence. When Difficulty is measured for each GOP, the number of bits "alloc-bit" is set for each GOP. When Difficulty is measured for each frame, the number of bits "alloc-bit" is set for each frame.

Figure 18:
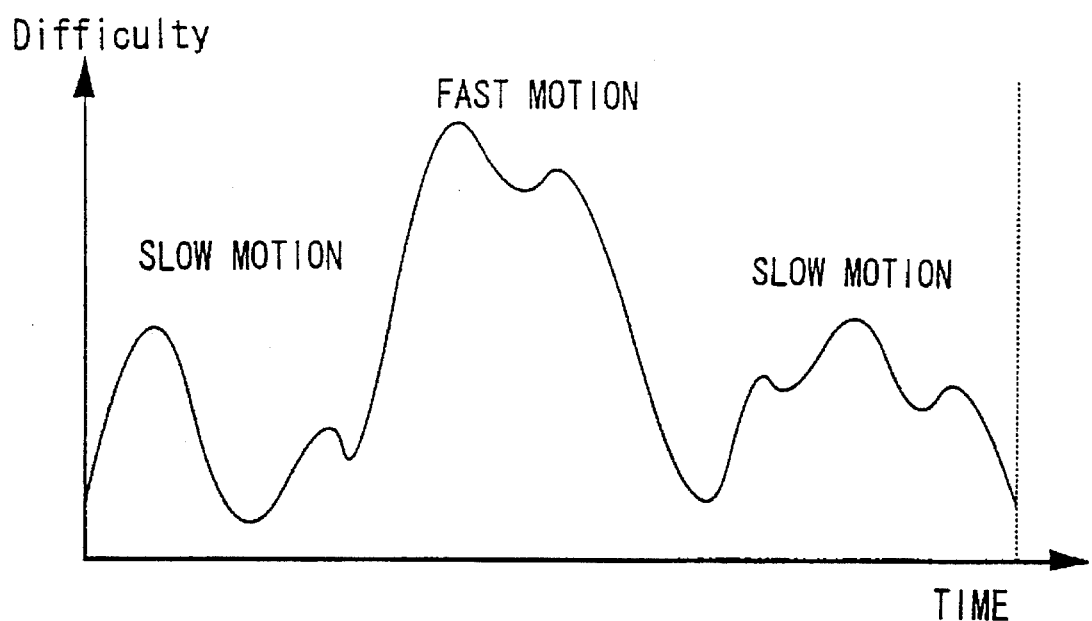
FIG. 18 is a characteristic curve for explaining the time distribution of the generated number of bits.

A case is described below in which Difficulty is measured for each GOP. However, the same is applied to the case in which Difficulty is measured for each frame. FIG. 18 shows a temporal change of the generated number of bits Difficulty measured for the first-time encoding. Even in one sequence, Difficulty fluctuates as shown in FIG. 18. For example, in the case of a scene with a fast motion, Difficulty heightens (the generated number of bits increases) because the correlation between frames lowers. However, in the case of a scene with a slow motion, Difficulty lowers (the generated number of bits decreases).

Figure 19:
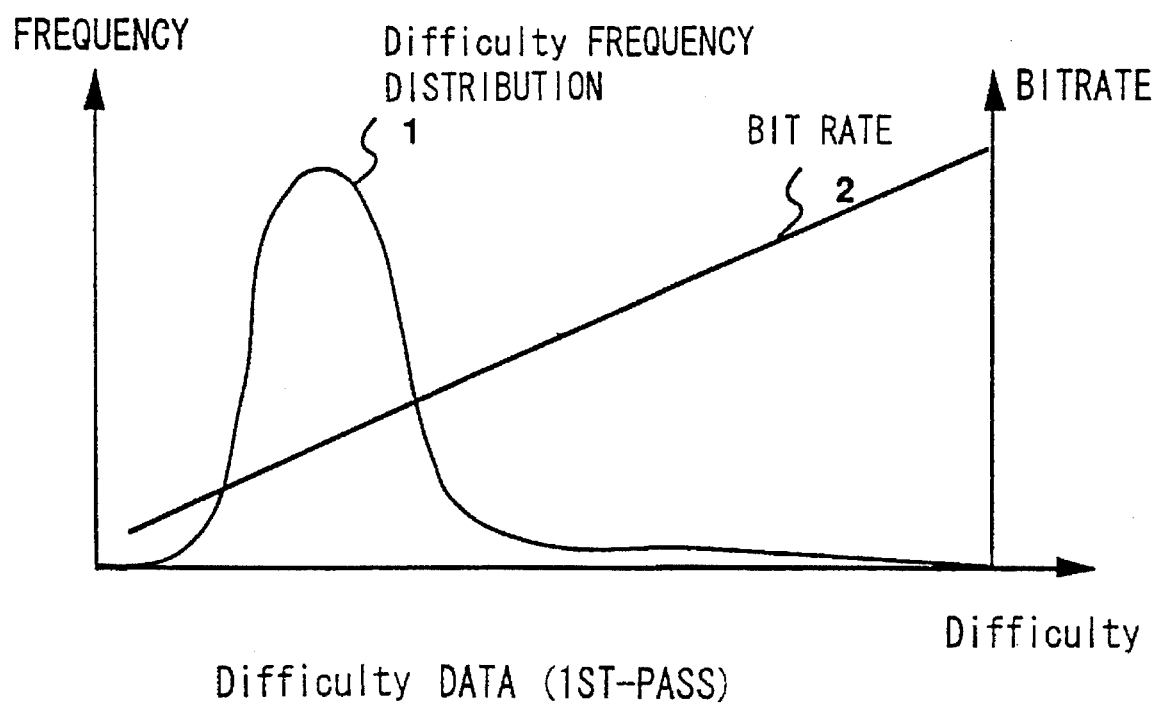
FIG. 19 is a characteristic curve for explaining the frequency distribution of the generated number of bits and an allocated bit rate.

FIG. 19 shows a frequency distribution of Difficulty for one sequence. Curve 1 shows the frequency distribution. The distribution depends on the picture sequence. In this case, the following expression (3) is effected by assuming a probability in which Difficulty of "d" is as "h(d)", a bit rate to be allocated to a GOP with Difficulty of "d" as "R(d)", and an average encoding bit rate as "AVR".

$$\Sigma h(d) = 1 \tag{3}$$

In this case, the bit rate R(d) is determined so that the following expression (4) is effected.

$$AVR = \Sigma(h(d) \times R(d)) \tag{4}$$

The bit rate R(d) can be shown by any curve. However, when the bit rate R(d) is allocated proportionally to Difficulty, curve 2 shown in FIG. 19 is obtained.

In this case, when it is assumed that Difficulty of the i-th GOP is "d-i" and the sum of Difficulty of all GOPs in a sequence is "d-all", the following expression (5) is effected.

$$d\text{-all} = \Sigma d\text{-}i \tag{5}$$

In this case, the number of bits "alloc-bit" allocated to the i-th GOP is shown by the following expression (6).

$$alloc\text{-}bit = AVR \times time \times d\text{-}i / d\text{-}all \tag{6}$$

Figure 20:
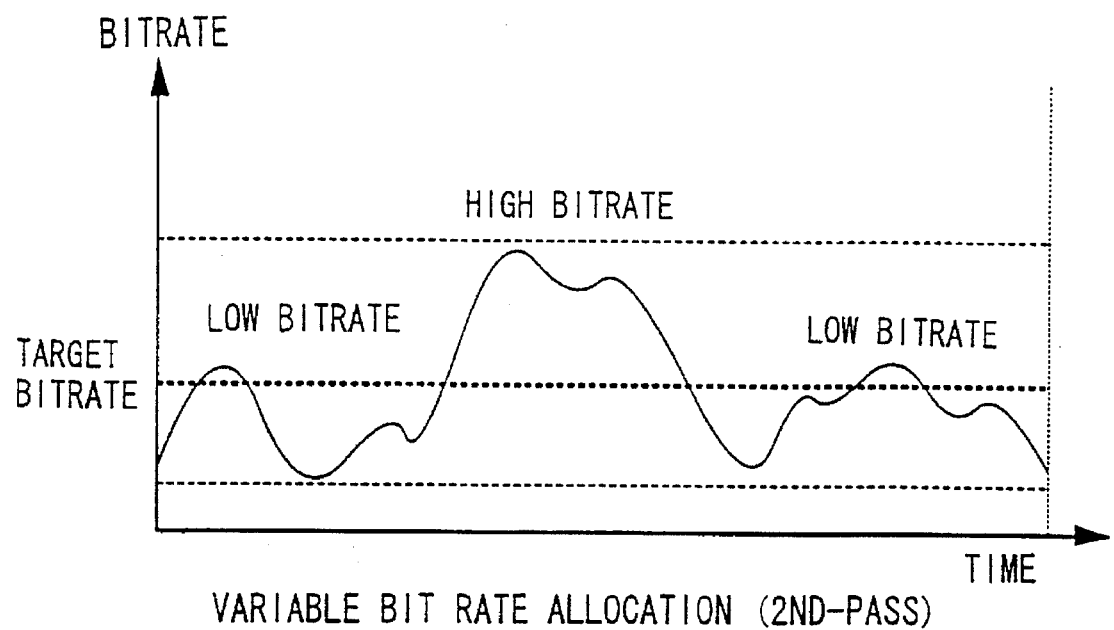
FIG. 20 is a characteristic curve for explaining an encoding bit rate.

FIG. 20 shows the temporal change of the bit rate thus allocated. In this case, though bits are linearly allocated, is also possible to allocate them non-linearly. The factor determination circuit 21 determines a filter factor signal from the number of bits "alloc-bit" and Difficulty determined as described above and stores the filter factor in the memory 20.

Thus, the above structure makes it possible to encode a motion picture a plurality of times, optimize an encoding parameter for encoding, measure the property of the motion picture signal, perform filtering by using the encoding parameter or the property of the measured motion picture signal and thereby optimizing the filter characteristic only for the final-time encoding, and practically generate and output an encoding signal (bit stream). Moreover, when encoding is performed at variable rates, the above structure makes it possible to perform proper filtering correspondingly to an encoding bit rate. Thereby, it is possible to adaptively switch filters in accordance with the property of a motion picture or the condition for encoding similarly to the case of the first embodiment and improve the encoding efficiency.

(3) Third Embodiment

Figure 21:
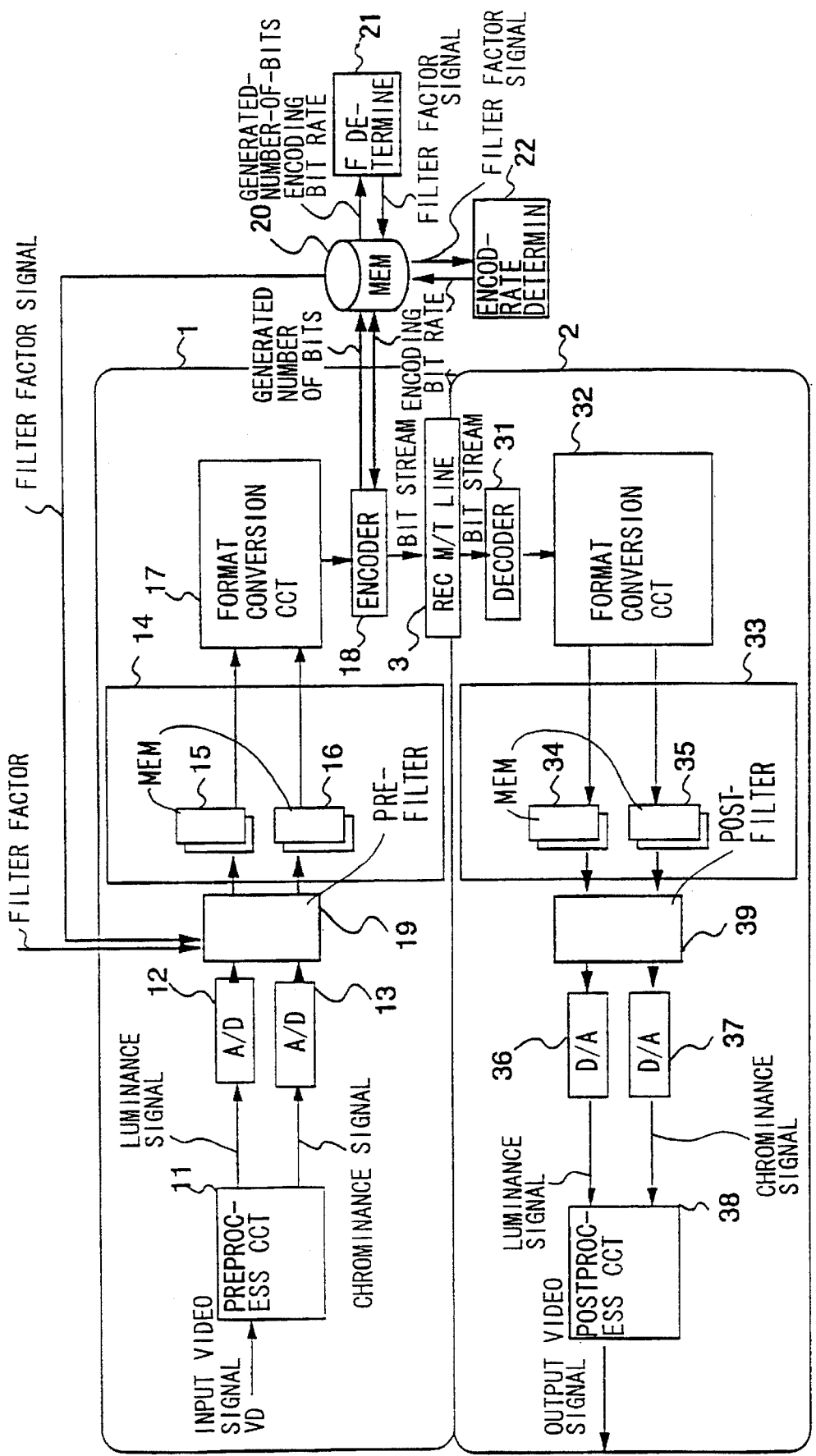
FIG. 21 is a block diagram showing the structure of the motion picture encoding/decoding apparatus of the third embodiment of the present invention.
Figure 22:
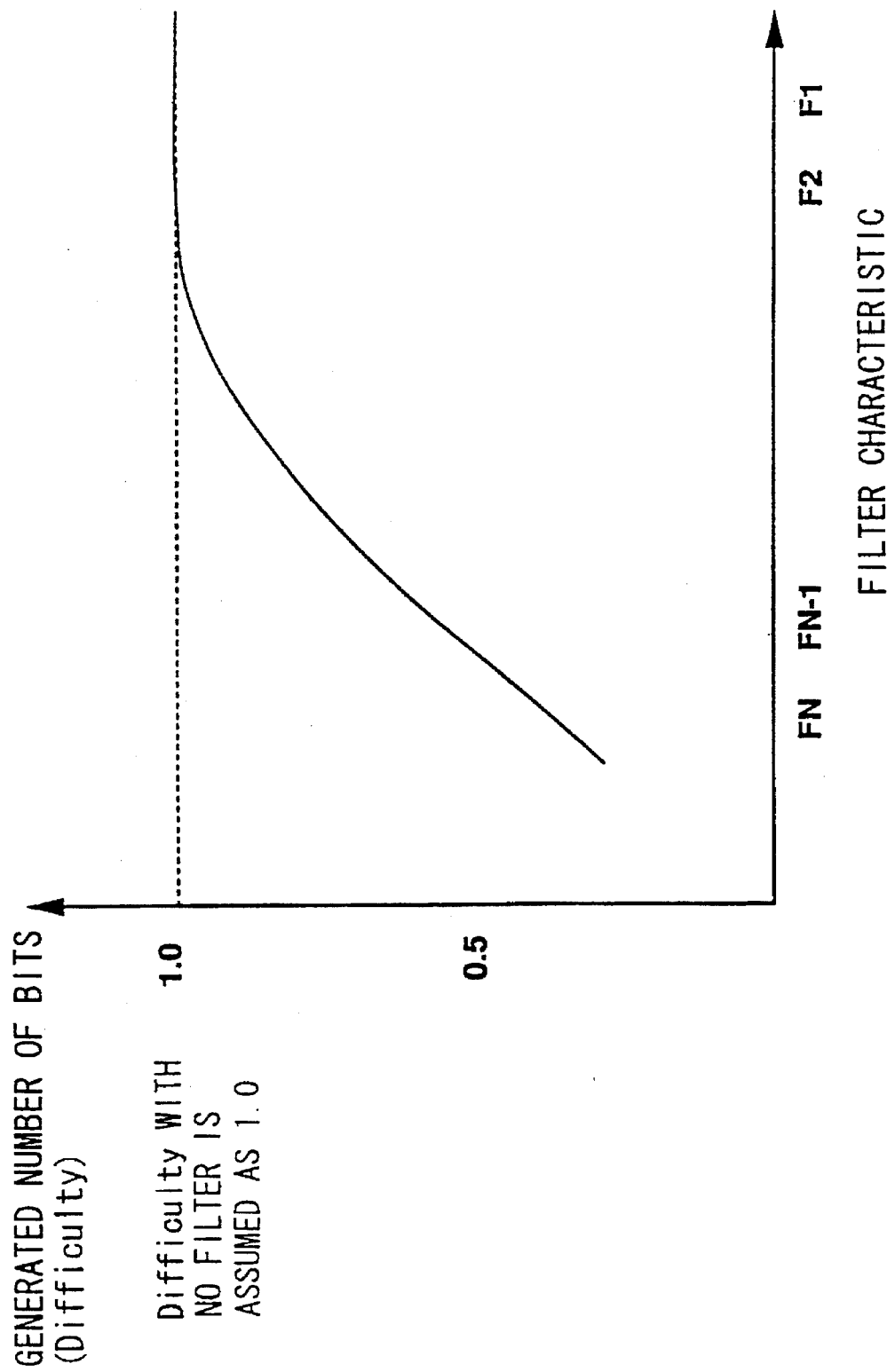
FIG. 22 is a characteristic curve for explaining a filter characteristic and decrease of the generated number of bits.

FIG. 21 shows the structure of the motion picture encoding/decoding apparatus of the third embodiment of the present invention. This embodiment is the same as the second embodiment except the encoding rate determination circuit 22. The encoding rate determination circuit 22 determines an encoding bit rate from Difficulty and a filter factor signal. When filtering a video signal, the encoding efficiency is improved and Difficulty decreases for the same picture. The decrease rate depends on a filter and a video signal used. It is assumed that previously-designed N filter factors F1 to FN decrease Difficulty as shown in, for example, FIG. 22.

Figure 23:
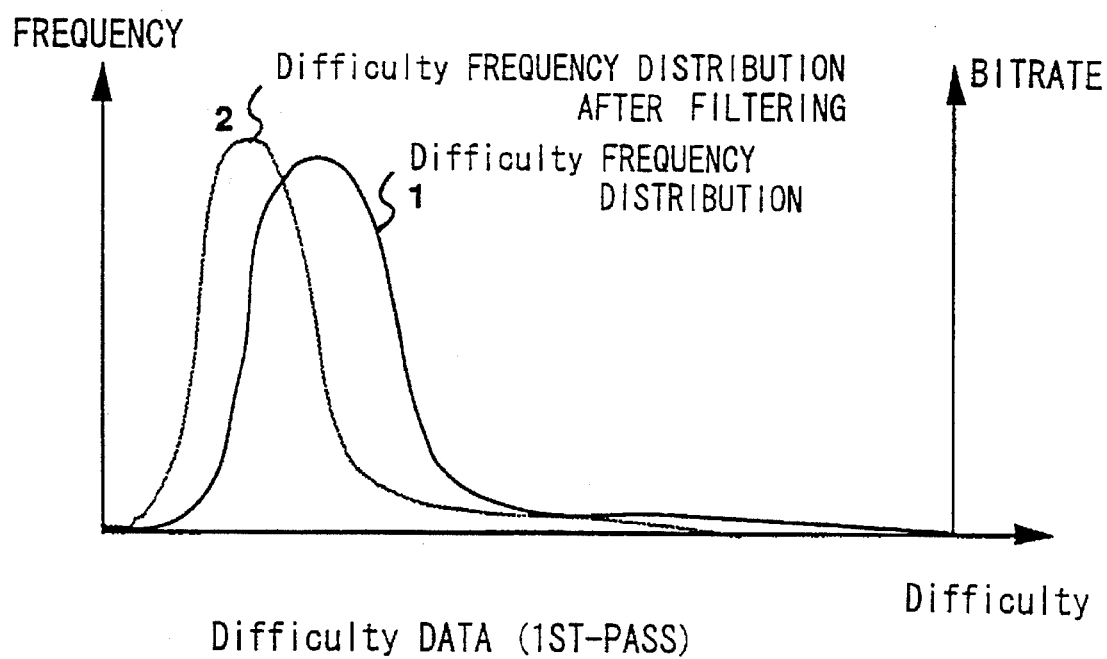
FIG. 23 is a characteristic curve for explaining the frequency distribution of the generated number of bits after filtering.

As described above, a filter with the filter factor F1 is the weakest filter and a filter with the filter factor FN is the strongest filter. The relation shown in FIG. 22 can be obtained by previously changing the filter factor of the same picture and measuring Difficulty. FIG. 23 shows how the frequency distribution of Difficulty changes due to filtering. In general, a distribution changes so that Difficulty decreases. It is possible to obtain how Difficulty decreases when using a filter from FIG. 22.

It is assumed that the decrease rate of Difficulty is f(FX) when using a filter FX. The function f(FX) has the value "1" when no filter is used and ranges from "0" to "1". When it is assumed that a picture with Difficulty of "d" changes to a picture with the generated number of bits of "d'" by using a filter, the picture can be shown by the following expression (7).

$$d' = d \times f(FX) \tag{7}$$

Then, by assuming that a probability in which the generated number of bits Difficulty is "d'" is "h'(d')", a bit rate to be allocated to a GOP with the generated number of bits Difficulty of "d'" is "R'(d')", and an average encoding bit rate is AVR, the following expression (8) is effected.

$$\Sigma h'(d') = 1 \tag{8}$$

In this case, the bit rate is determined so that the following expression (9) is effected.

$$\begin{aligned} AVR &= \Sigma (h'(d') \times R'(d')) \\ &= \Sigma (h'(d \times f(FX)) \times R'(d \times f(FX))) \end{aligned} \tag{9}$$

The bit rate R'(d') can be shown by any curve. However, a case is described below in which the bit rate is allocated proportionally to the filtered Difficulty.

When it is assumed that Difficulty of the i-th GOP is "d-i", a filter used for the i-th GOP is "F-i", and the sum of Difficulty of all filtered GOPs in a sequence is "d-all", the following expression (10) is effected.

$$d\text{-}all = \Sigma(d\text{-}i \times f(F\text{-}i)) \tag{10}$$

In this case, the number of bits "alloc-bit" to be allocated to the i-th GOP is obtained from the following expression (11).

$$alloc\text{-}bit = AVR \times time \times d\text{-}i \times f(F\text{-}i)/d\text{-}all \tag{11}$$

The bit rate thus allocated always serves as the optimum rate for a filtered picture. Moreover, thereby, it is possible to decrease the number of bits used for a scene to be easily encoded and allocate a lot of bits to a scene not to be easily encoded but extremely deteriorated.

Thus, the above structure makes it possible to encode a motion picture a plurality of times, optimize an encoding parameter for encoding, measure the property of the motion picture, perform filtering by using the encoding parameter or the property of the measured motion picture signal and thereby optimizing the filter characteristic only for the final-time encoding, and practically generate and output an encoding signal (bit stream). Moreover, when encoding is performed at variable rates, the above structure makes it possible to perform proper filtering correspondingly to an encoding bit rate. Thereby, it is possible to adaptively switch filters in accordance with the property of a motion picture or the condition for encoding similarly to the case of the second embodiment and improve the encoding efficiency.

While there has been described in connection with the preferred embodiments of the invention, it will be obvious to those skilled in the art that various changes and modifications may be aimed, therefore, to cover in the appended claims all such changes and modifications as fall within the true spirit and scope of the invention.

What is claimed is:

1. A motion picture encoding method for encoding a motion picture signal by using a predetermined prediction picture signal so as to obtain an encoded signal, applying a predetermined operation to said encoded signal so as to obtain a predetermined operation signal, quantizing said predetermined operation signal obtained from said operation so as to obtain a quantized signal, and variable-length-encoding said quantized signal, the method comprising the steps of:

encoding the same motion picture signal a plurality of times, measuring the property of said motion picture signal in accordance with the information for said encoding, and filtering said motion picture signal in accordance with the property of said measured motion picture signal.

2. The motion picture encoding method according to claim 1, wherein the number of bits generated by encoding said motion picture signal is measured as the property of said motion picture signal.

3. The motion picture encoding method according to claim 2, wherein said generated number of bits is measured by fixing a quantization scale for said quantization.

4. A motion picture encoding method for encoding a motion picture signal by using a predetermined prediction picture signal so as to obtain an encoded signal, applying a predetermined operation to said encoded signal so as to obtain a predetermined operation signal, quantizing said predetermined operation signal obtained from said operation so as to obtain a quantized signal, and variable-length-encoding said quantized signal, the method comprising the steps of:

encoding the same motion picture signal a plurality of times and measuring the property of said motion picture signal in accordance with the information for said encoding; and filtering said motion picture signal for the final encoding of said motion picture signal in accordance with the property of said measured motion picture signal and encoding said motion picture signal.

5. The motion picture encoding method according to claim 4, wherein the number of bits generated by encoding said motion picture signal is measured as the property of said motion picture signal.

6. The motion picture encoding method according to claim 5, wherein said generated number of bits is measured by fixing a quantization scale for said quantization.

7. A motion picture encoding method for encoding a motion picture signal by using a predetermined prediction picture signal so as to obtain an encoded signal, applying a predetermined operation to said encoded signal so as to obtain a predetermined operation signal, quantizing said predetermined operation signal obtained from said operation so as to obtain a quantized signal, and variable-length-encoding said quantized signal, the method comprising the steps of:

encoding the same motion picture signal a plurality of times and measuring the property of said motion picture signal in accordance with the information for said encoding;

filtering said motion picture signal in accordance with the property of said measured motion picture signal at the final encoding of said motion picture signal; and determining an encoding bit rate for the final encoding in accordance with the property of said motion picture signal and the filter characteristic used for said filtering, and encoding a motion picture signal at a variable rate.

8. The motion picture encoding method according to claim 7, wherein the number of bits generated by encoding said motion picture signal is measured as the property of said motion picture signal.

9. The motion picture encoding method according to claim 8, wherein said generated number of bits is measured by fixing a quantization scale for said quantization.

10. A motion picture encoding apparatus for encoding a motion picture signal by using a predetermined prediction picture signal so as to obtain an encoded signal, applying a predetermined operation to said encoded signal so as to obtain a predetermined operation signal, quantizing said predetermined operation signal obtained from said operation so as to obtain a quantized signal, and variable-length-encoding said quantized signal, the apparatus comprising:

measurement means for encoding the same motion picture signal a plurality of times and measuring the property of said motion picture signal in accordance with the information for said encoding; and filter means for filtering said motion picture signal in accordance with the property of said measured motion picture signal.

11. The motion picture encoding apparatus according to claim 10, wherein the number of bits generated by encoding said motion picture signal is measured as the property of said motion picture signal.

12. The motion picture encoding apparatus according to claim 11, wherein said generated number of bits is measured by fixing a quantization scale for said quantization.

13. A motion picture encoding apparatus for encoding a motion picture signal by using a predetermined prediction picture signal so as to obtain an encoded signal, applying a predetermined operation to said encoded signal so as to obtain a predetermined operation signal, quantizing said predetermined operation signal obtained from said operation so as to obtain a quantized signal, and variable-length-encoding said quantized signal, the apparatus comprising:

measurement means for encoding the same motion picture signal a plurality of times and measuring the property of said motion picture signal in accordance with the information for said encoding;

filter means for filtering said motion picture signal in accordance with the property of said measured motion picture signal at the final encoding of said motion picture signal; and encoding-bit-rate determination means for determining an encoding bit rate for the final encoding in accordance with the property of said motion picture signal and the filter characteristic used for said filtering.

14. The motion picture encoding apparatus according to claim 13, wherein the number of bits generated by encoding said motion picture signal is measured as the property of said motion picture signal.

15. The motion picture encoding apparatus according to claim 14, wherein said generated number of bits is measured by fixing a quantization scale fog said quantization.

* * * * *